United States Patent
Kim et al.

(10) Patent No.: US 9,176,749 B2
(45) Date of Patent: Nov. 3, 2015

(54) RENDERING ACROSS TERMINALS

(75) Inventors: Kyung-Geun Kim, Gyeonggi-Do (KR);
Sung-Ha Choi, Seoul (KR);
Hyeon-Cheol Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 12/697,706

(22) Filed: Feb. 1, 2010

(65) Prior Publication Data

US 2010/0295803 A1 Nov. 25, 2010

(30) Foreign Application Priority Data

May 19, 2009 (KR) ........................ 10-2009-0043682

(51) Int. Cl.
G06F 3/041 (2006.01)
G06F 9/44 (2006.01)
G06F 3/0488 (2013.01)

(52) U.S. Cl.
CPC ............ *G06F 9/4445* (2013.01); *G06F 3/0488* (2013.01)

(58) Field of Classification Search
CPC ....... G06F 3/041; G06F 3/033; G06F 9/4445; G06F 3/0488
USPC ................ 340/995.1; 715/750, 751, 753, 754
See application file for complete search history.

(56) References Cited

U.S. PATENT DOCUMENTS

| | | | |
|---|---|---|---|
| 6,842,170 B1 * | 1/2005 | Akins et al. | 345/173 |
| 7,970,870 B2 * | 6/2011 | Hinckley et al. | 709/220 |
| 8,042,044 B2 * | 10/2011 | Van Leeuwen | 715/702 |
| 2003/0052797 A1 * | 3/2003 | Rock et al. | 340/936 |
| 2003/0156097 A1 * | 8/2003 | Kakihara et al. | 345/156 |
| 2004/0150627 A1 * | 8/2004 | Luman et al. | 345/173 |
| 2006/0131415 A1 * | 6/2006 | Irons | 235/454 |
| 2008/0103612 A1 | 5/2008 | Bergmann et al. | |
| 2008/0305742 A1 | 12/2008 | Basir | |
| 2009/0042518 A1 * | 2/2009 | Ido et al. | 455/90.2 |
| 2009/0098907 A1 * | 4/2009 | Huntzicker et al. | 455/556.1 |
| 2009/0195513 A1 * | 8/2009 | Dybalski et al. | 345/173 |
| 2009/0300131 A1 * | 12/2009 | Gantman et al. | 709/208 |

FOREIGN PATENT DOCUMENTS

| | | |
|---|---|---|
| DE | 10 2007 041913 A1 | 3/2009 |
| EP | 1 338 866 A2 | 8/2003 |
| EP | 2 053 361 A1 | 4/2009 |
| KR | 10-0758058 B1 | 9/2007 |
| KR | 2009-0038216 A | 4/2009 |
| WO | WO 2008/148222 A1 | 12/2008 |
| WO | WO 2009/030534 A1 | 3/2009 |

OTHER PUBLICATIONS

European Search Report dated Jul. 11, 2013 for Application No. 10002518.8, 6 pages.

* cited by examiner

*Primary Examiner* — Towfiq Elahi
(74) *Attorney, Agent, or Firm* — Fish & Richardson P.C.

(57) ABSTRACT

A graphical user interface is generated at a mobile communication terminal having a first touch screen of a first size, the graphical user interface including one or more touch screen input options. The generated graphical user interface is transmitted from the mobile communication terminal and to a vehicle communication terminal having a second touch screen of a second size. An indication of touch screen input received at the second touch screen of the vehicle communication terminal is received at the mobile communication terminal and from the vehicle communication terminal. A function corresponding to the touch screen input received at the second touch screen of the vehicle communication terminal is executed at the mobile communication terminal.

21 Claims, 21 Drawing Sheets

RENDERING ACROSS TERMINALS

CROSS-REFERENCE TO RELATED APPLICATION

Pursuant to 35 U.S.C. § 119(a), this application claims the benefit of the earlier filing date and right of priority to Korean Application No. 10-2009-0043682, filed on May 19, 2009, the contents of which is incorporated by reference herein in its entirety.

BACKGROUND

Navigation devices can be used to provide mapping and routing information to users. In-vehicle navigation devices or portable navigation devices can be used to provide driving directions while a user traverses a route. Many such navigation systems rely upon Global Positioning System (GPS) functionality to determine the location of the vehicle and use the determined location in providing driving directions. In addition, navigation devices may include a display unit to display routing and location information to a user.

SUMMARY

In general, in some aspects, a method includes generating a graphical user interface at a mobile communication terminal having a first touch screen of a first size, the graphical user interface including one or more touch screen input options. The method also includes transmitting, from the mobile communication terminal and to a vehicle communication terminal having a second touch screen of a second size, the generated graphical user interface. The method further includes receiving, at the mobile communication terminal and from the vehicle communication terminal, an indication of touch screen input received at the second touch screen of the vehicle communication terminal. The method additionally includes executing, at the mobile communication terminal, a function corresponding to the touch screen input received at the second touch screen of the vehicle communication terminal.

This and other implementations can optionally include one or more of the following features, which also may optionally be in any combination. For example, the method may include matching, at the mobile communication terminal, the indication of touch screen input that was received at the second touch screen of the vehicle communication terminal to a touch screen input option of the generated graphical user interface and executing the function corresponding to the touch screen input can include executing the function corresponding to the matched touch screen input option of the generated graphical user interface. Executing the function corresponding to the matched touch screen input option can include generating a second graphical user interface including one or more second touch screen input options and the method can include transmitting, from the mobile communication terminal and to the vehicle communication terminal, the generated second graphical user interface, receiving, at the mobile communication terminal and from the vehicle communication terminal, an indication of further touch screen input received at the second touch screen of the vehicle communication terminal, matching, at the mobile communication terminal, the indication of further touch screen input that was received at the second touch screen of the vehicle communication terminal to a further touch screen input option of the generated second graphical user interface and executing, at the mobile communication terminal, a further function corresponding to the matched further touch screen input option of the generated second graphical user interface.

Also, the method can additionally include displaying the generated graphical user interface on the first touch screen of the mobile communication terminal. The matched touch screen input option can correspond both to a first set of coordinates with respect to the first touch screen of the mobile communication terminal and a second set of coordinates with respect to the second touch screen of the vehicle communication terminal. Receiving the indication of touch screen input can include receiving coordinate information. Receiving the coordinate information can include receiving coordinate information that corresponds to coordinates of the first touch screen of the mobile communications terminal. Receiving the coordinate information can include receiving coordinate information that corresponds to the second touch screen of the vehicle communications terminal. Executing the function corresponding to the touch screen input can include placing a telephone call to a number corresponding to an entry in a phonebook.

Further, generating the graphical user interface can include generating a map corresponding to a route. The method can also include receiving, at the mobile communication terminal and from the vehicle communication terminal, information regarding the status of the vehicle. Generating the graphical user interface at the mobile communication terminal can include generating the graphical user interface as including the received information regarding the status of the vehicle. The method can additionally include receiving, at the mobile communication terminal and from the vehicle communication terminal, information regarding at least one of a vehicle speed and a vehicle operating condition. Generating the graphical user interface at the mobile communication terminal can include generating the graphical user interface as including the received at least one of the vehicle speed and the vehicle operating condition and transmitting the generated graphical user interface can include transmitting the generated graphical user interface including the received at least one of the vehicle speed and the vehicle operating condition.

In other implementations, some aspects include a mobile communication terminal. The terminal includes a first touch screen, a communication unit configured to communicate with a vehicle communication terminal, and a controller. The controller is configured to generate a graphical user interface including one or more touch screen input options and transmit, via the communication unit and to the vehicle communication terminal, the generated graphical user interface. The controller is also configured to receive, via the communication unit and from the vehicle communication terminal, an indication of touch screen input received at a second touch screen of the vehicle communication terminal and match the indication of touch screen input that was received at the second touch screen of the vehicle communication terminal to a touch screen input option of the generated graphical user interface. The controller is further configured to execute a function corresponding to the matched touch screen input option of the generated graphical user interface.

This and other implementations can optionally include one or more of the following features, which also may optionally be in any combination. For example, the controller can include one or more processors. To execute the function corresponding to the matched touch screen input option, the controller can be configured to generate a second graphical user interface including one or more second touch screen input options, transmit, via the communication unit and to the vehicle communication terminal, the generated second graphical user interface, receive, via the communication unit and from the vehicle communication terminal, an indication of further touch screen input received at the second touch screen of the vehicle communication terminal, match the indication of further touch screen input that was received at the second touch screen of the vehicle communication terminal to a further touch screen input option of the generated second graphical user interface, and execute a further function corresponding to the matched further touch screen input option of the generated second graphical user interface.

Also, to receive the indication of touch screen input, the controller can be configured to receive coordinate information. To receive coordination information, the controller can be configured to receive coordinate information that corresponds to coordinates of the first touch screen of the mobile communications terminal. To receive coordination information, the controller can be configured to receive coordinate information corresponds to the second touch screen of the vehicle communications terminal. To execute the function corresponding to the matched touch screen input option of the generated graphical user interface, the controller can be configured to place a telephone call to a number corresponding to an entry in a phonebook. To generate the graphical user interface, the controller can be configured to generate a map corresponding to a route. The controller can be configured to receive, via the communication unit and from the vehicle communication terminal, information regarding a vehicle speed or operating condition and, to generate the graphical user interface, the controller can be configured to generate the graphical user interface as including the received vehicle speed or operating condition.

In other implementations, some aspects include a method. The method includes receiving, at a vehicle communication terminal and from a mobile communication terminal, a graphical user interface associated with one or more touch screen input options. The mobile communication terminal includes a first touch screen of a first size and the vehicle communication terminal includes a second touch screen of a second size. The method also includes rendering, on the second touch screen of the vehicle communication terminal, the received graphical user interface associated with the one or more touch screen input options and receiving, on the second touch screen of the vehicle communication terminal, touch screen input corresponding to a touch screen input option. The method additionally includes sending, from the vehicle communication terminal and to the mobile communication terminal, an indication of the received touch screen input corresponding to the touch screen input option.

This and other implementations can optionally include one or more of the following features, which also may optionally be in any combination. For example, the method can also include processing the received graphical user interface to adjust the graphical user interface from compatibility with the first touch screen of the first size to the second touch screen of the second size. Processing the received graphical user interface can include adjusting the touch screen input option from corresponding to a first set of coordinates to corresponding to a second set of coordinates. Sending the indication of the received touch screen input corresponding to the touch screen input option can include sending an indication of the first set of coordinates.

In addition, sending the indication of the received touch screen input corresponding to the touch screen input option can include sending an indication of the second set of coordinates. Receiving the graphical user interface can include receiving a map corresponding to a route. The method can further include sending, from the vehicle communication terminal and to the mobile communication terminal, information regarding the status of the vehicle. Sending the information regarding the status of the vehicle can include sending at least one of a vehicle speed and a vehicle operating condition.

In other implementations, some aspects include a vehicle communication terminal. The terminal includes a vehicle terminal touch screen, a communication unit configured to communicate with a mobile communication terminal, and a controller. The controller is configured to receive, via the communication unit and from a mobile communication terminal having a mobile terminal touch screen, a graphical user interface associated with one or more touch screen input options and render, on the vehicle terminal touch screen, the received graphical user interface associated with the one or more touch screen input options. The controller is also configured to receive, on the vehicle terminal touch screen, touch screen input corresponding to a touch screen input option and send, via the communication unit and to the mobile communication terminal, an indication of the received touch screen input corresponding to the touch screen input option.

This and other implementations can optionally include one or more of the following features, which also may optionally be in any combination. For example, the controller can include one or more processors. The mobile terminal touch screen can have a first size, the vehicle terminal touch screen can have a second size, and the controller can be configured to process the received graphical user interface to adjust the graphical user interface from compatibility with the first touch screen of the first size to compatibility with the second touch screen of the second size. To process the received graphical user interface, the controller can be configured to adjust the touch screen input option from corresponding to a first set of coordinates to corresponding to a second set of coordinates.

Moreover, to send the indication of the received touch screen input corresponding to the touch screen input option, the controller can be configured to send an indication of the first set of coordinates. To send the indication of the received touch screen input corresponding to the touch screen input option, the controller can be configured to send an indication of the second set of coordinates. The controller can be configured to send, via the communication unit and to the mobile communication terminal, information regarding the status of the vehicle. To send the information regarding the status of the vehicle, the controller can be configured to send at least one of a vehicle speed and a vehicle operating condition.

The foregoing and other objects, features, aspects, and advantages will become more apparent from the following detailed description when taken in conjunction with the accompanying drawings.

BRIEF DESCRIPTION OF THE DRAWINGS

Like reference symbols in the various drawings indicate like elements.

DETAILED DESCRIPTION

Figure 1:
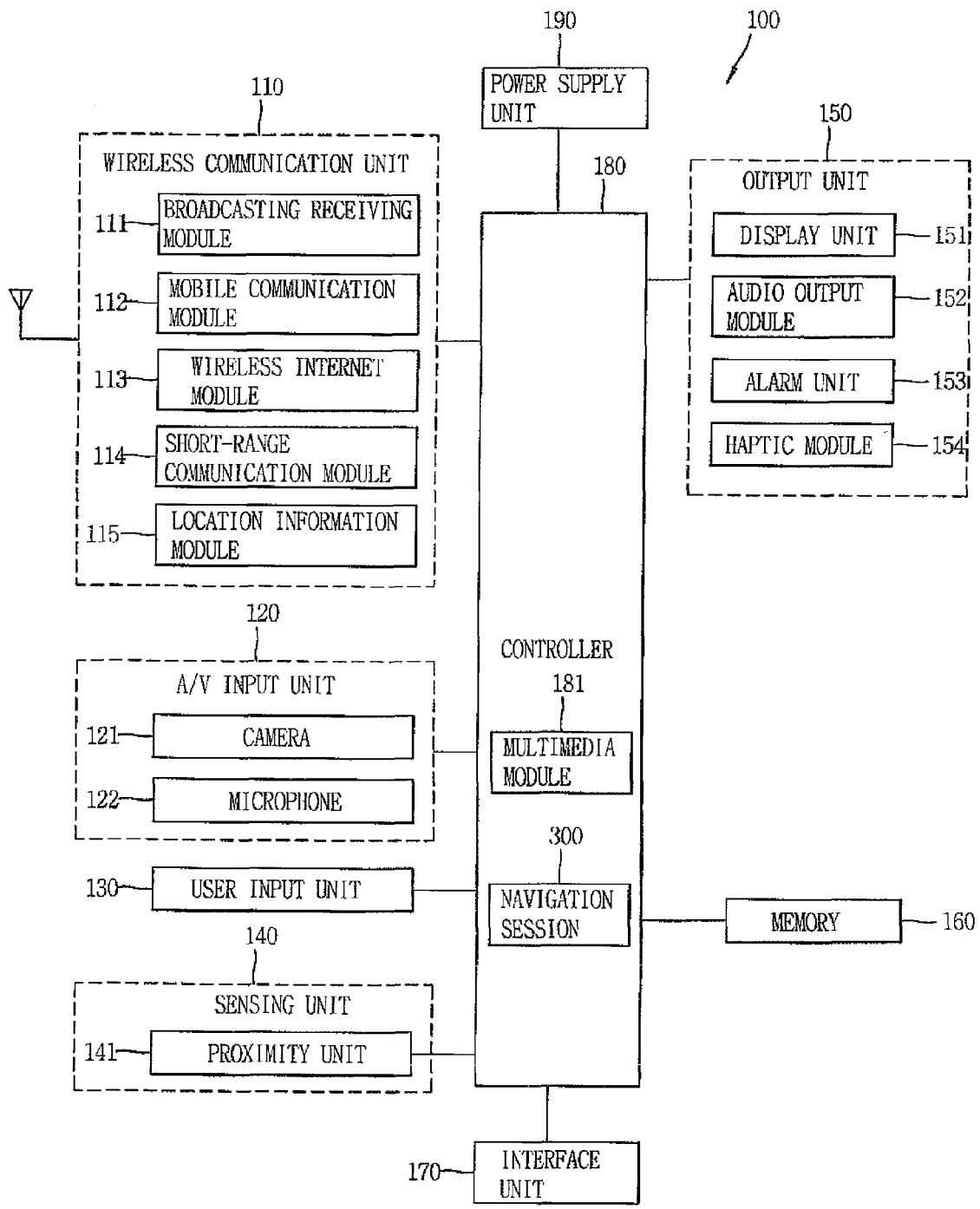
FIG. 1 is a schematic block diagram showing a configuration of a mobile communication terminal.

FIG. 1 is a schematic block diagram showing the configuration of a mobile communication terminal 100. The mobile communication terminal 100 may be implemented in various forms such as mobile phones, smart phones, notebook computers, digital broadcast terminals, PDAs (Personal Digital Assistants), PMPs (Portable Multimedia Player), or other forms. As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. The configuration of FIG. 1 is exemplary, as the mobile communication terminal 100 may be include greater or fewer components.

The wireless communication unit 110 can include one or more components providing functionality for radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, or another signal. Also, the broadcast signal may further include a broadcast signal combined with a TV or radio broadcast signal.

The broadcast associated information also may be provided via a mobile communication network and, in this case, the broadcast associated information may be received by the mobile communication module 112. The broadcast signal may exist in various forms. For example, broadcast associated information may be implemented according to various formats, such as electronic program guide (EPG) of digital multimedia broadcasting (DMB) or electronic service guide (ESG) of digital video broadcast-handheld (DVB-H).

The broadcast receiving module 111 may be configured to receive signals broadcast using various types of broadcast systems. In particular, the broadcast receiving module 111 may receive a digital broadcast using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), or other broadcast system. The broadcast receiving module 111 may be configured to be suitable for broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit and receive radio signals to and from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception. The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency Identification (RFID), Infrared Data Association (IrDA), Ultra-WideBand (UWB), and ZigBee™.

The location information module 115 is a module for checking or acquiring a location (or position) of the mobile communication terminal or vehicle in which the mobile communication terminal is located. For example, the location information module 115 may be embodied using a GPS module that receives location information from a plurality of satellites. Here, the location information may include coordinate information represented by latitude and longitude values. For example, the GPS module may measure time and distance with respect to three or more satellites so as to accurately calculate a current location of the mobile communication terminal 100 according to trigonometry based on the measured time and distances. A method of acquiring distance and time information from three satellites and performing error correction with a single satellite may be used. In particular, the GPS module may acquire time and three-dimensional speed information as well as a latitude, longitude, and altitude from the location information received from the satellites. A Wi-Fi position system and/or hybrid positioning system may be used as the location information module 115.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on the display unit 151 (or other visual output device). The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, or other modes and can process the received sounds into audio data. In implementations using mobile telephone systems, the processed audio data may be converted for output into a format transmittable to a mobile communication base station (or other network entity) via the mobile communication module 112. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, or other input mechanisms. In particular, when the touch pad is overlaid on the display unit 151 in a layered manner, it may form a touch screen.

The sensing unit 140 detects a current status (or state) of the mobile communication terminal 100, such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100 so as to generate commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, a haptic module 154, or other components.

The display unit 151 may output information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging or multimedia file downloading). When the mobile communication terminal 100 is in a video call mode or image capturing mode, the display unit 151 may display a captured image and/or a received image, a UI or GUI that shows videos or images and functions related thereto. The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile communication terminal 100 may include two or more display units (or other display means) according to its particular desired functionality. For example, a plurality of display units may be separately or integrally disposed on one surface of the mobile terminal, or may be separately disposed on mutually different surfaces. When the display unit 151 and a sensor (referred to as a 'touch sensor' or 'touch screen,' hereinafter) for detecting a touch operation are overlaid in a layered manner to form a touch screen, the display unit 151 may function as both an input device and an output device. The touch sensor may, for example, have a form of a touch film, a touch sheet, a touch pad, or a touch panel. In some cases, touch sensors (or touch screens) can operate without an actual physical contact. For example, touch screens operating on changed capacitance or other electrical characteristics may operate by the nearby presence of a finger or object with or without physical contact with the screen. As such, a "touch screen" may not actually require a touch for operation.

The touch sensor may be configured to convert pressure applied to a particular portion of the display unit 151 or a change in the capacitance or other electrical characteristic at a particular portion of the display unit 151 into an electrical input signal. The touch sensor may be configured to detect the pressure when a touch is applied, as well as the touched position and area. When there is a touch input with respect to the touch sensor, a corresponding signal is transmitted to a touch controller (not shown). The touch controller processes the signals and transmits corresponding data to the controller 180. Accordingly, the controller 180 may recognize which portion of the display unit 151 has been touched.

The proximity sensor 141 may be disposed within or near the touch screen. The proximity sensor 141 is a sensor for detecting the presence or absence of an object relative to a certain detection surface or an object that exists nearby using the force of electromagnetism or infrared rays without a physical contact. Thus, the proximity sensor 141 can have a considerably longer life span than a contact type sensor and can be utilized for various purposes. Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is a capacitance type touch screen, proximity of the pointer can be detected by a change in electric field according to the proximity of the pointer. In this case, the touch screen may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen. By employing the proximity sensor 141, a proximity touch and a proximity touch pattern (e.g., a proximity touch distance, a proximity touch speed, a proximity touch time, a proximity touch position, or a proximity touch movement state) can be detected, and information corresponding to the detected proximity touch operation and the proximity touch pattern can be outputted to the touch screen.

The audio output module 152 may convert and output sound from audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may provide audible outputs related to a particular function executed by the mobile communication terminal 100 (e.g., a call signal reception sound or a message reception sound). The audio output module 152 may include a speaker, a buzzer, or other sound generating device.

The alarm unit 153 may provide outputs to inform a user about the occurrence of an event of the mobile communication terminal 100. Typical events may include receipt of a call, receipt of a message, or received key or touch input. In addition to audio or video outputs, the alarm unit 153 may provide outputs in a different manner to inform the user about the occurrence of an event. For example, the alarm unit 153 may provide an output in the form of vibration (or other tactile or sensible output). In particular, when a call, a message, or some other incoming communication is received, the alarm unit 153 may provide tactile output (i.e., vibration) to inform the user thereof. By providing such tactile output, the user can recognize the occurrence of various events even if his mobile phone is in the user's pocket. Output informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects. The generated effects can include stimulation with a pin arrangement moving vertically with respect to a contact skin, a spray force or suction force of air through a jet orifice or a suction opening, a contact on the skin, a contact of an electrode, electrostatic force, and the sense of cold or warmth using an element that can absorb or generate heat. In addition, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100.

The memory 160 may store software programs used for the processing and controlling operations performed by the controller 180, or may temporarily store data (e.g., a phonebook, messages, still images, or video) that are inputted or outputted. In addition, the memory 160 may store data regarding various patterns of vibrations and audio signals outputted when a touch is inputted to the touch screen.

The memory 160 can be implemented using any type of suitable storage medium, such as, for example, a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with every external device connected with the mobile communication terminal 100. For example, the external devices may transmit data to an external device, receive and transmit power to each element of the mobile communication terminal 100, or transmit internal data of the mobile communication terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, and earphone ports.

The identification module may be a chip that stores various information for authenticating the authority of using the mobile communication terminal 100. This information may include a user identity module (UIM), a subscriber identity module (SIM) a universal subscriber identity module (USIM), or other information. In addition, the device having the identification module (referred to as 'identifying device', hereinafter) may take the form of a smart card. Accordingly, the identifying device may be connected with the terminal 100 via a port. The interface unit 170 may be used to receive input (e.g., data, information, power, etc.) from an external device and transfer the received input to one or more elements within the mobile communication terminal 100 or may be used to transfer data between the mobile terminal and an external device.

When the mobile communication terminal 100 is connected with an external cradle, the interface unit 170 may serve as a passage to allow power from the cradle to be supplied therethrough to the mobile communication terminal 100 or may serve as a passage to allow various command signals inputted by the user from the cradle to be transferred to the mobile terminal therethrough. Various command signals or power inputted from the cradle may operate as signals for recognizing that the mobile communication terminal 100 is properly mounted on the cradle.

The controller 180 typically controls the general operations of the mobile terminal. For example, the controller 180 performs controlling and processing associated with voice calls, data communications, video calls, or other operations. The controller 180 may include a multimedia module 181 for reproducing multimedia data. The multimedia module 181 may be configured within the controller 180 or may be configured to be separated from the controller 180. Also, the controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable medium using, for example, software, hardware, or a combination thereof. For hardware implementations, the embodiments described herein may be implemented using at least one of application specific integrated circuits (ASICs), digital signal processors (DSPs), digital signal processing devices (DSPDs), programmable logic devices (PLDs), field programmable gate arrays (FP- GAs), processors, controllers, micro-controllers, microprocessors, or other electronic units designed to perform the functions described herein. In some implementations, functionality may be implemented by the controller 180 itself.

For software implementations, the techniques described below may be implemented by separate software modules. Each software module may perform one or more functions or operations described herein. Software codes can be implemented by a software application written in any suitable programming language. The software codes may be stored in the memory 160 and executed by the controller 180. In addition, a navigation session 300 applied to the mobile communication terminal 100 provides a general navigation function.

Meanwhile, the controller 180 applied to the mobile communication terminal 100 transmits information displayed on the mobile communication terminal 100 to a particular terminal connected to the mobile communication terminal 100, match information (e.g., control information) transmitted from the particular terminal to information displayed on the mobile communication terminal 100 to perform a function corresponding to the matching results, display the information displayed on the mobile communication terminal 100 also on the particular terminal, and can control the function of the mobile communication terminal 100.

Figure 2:
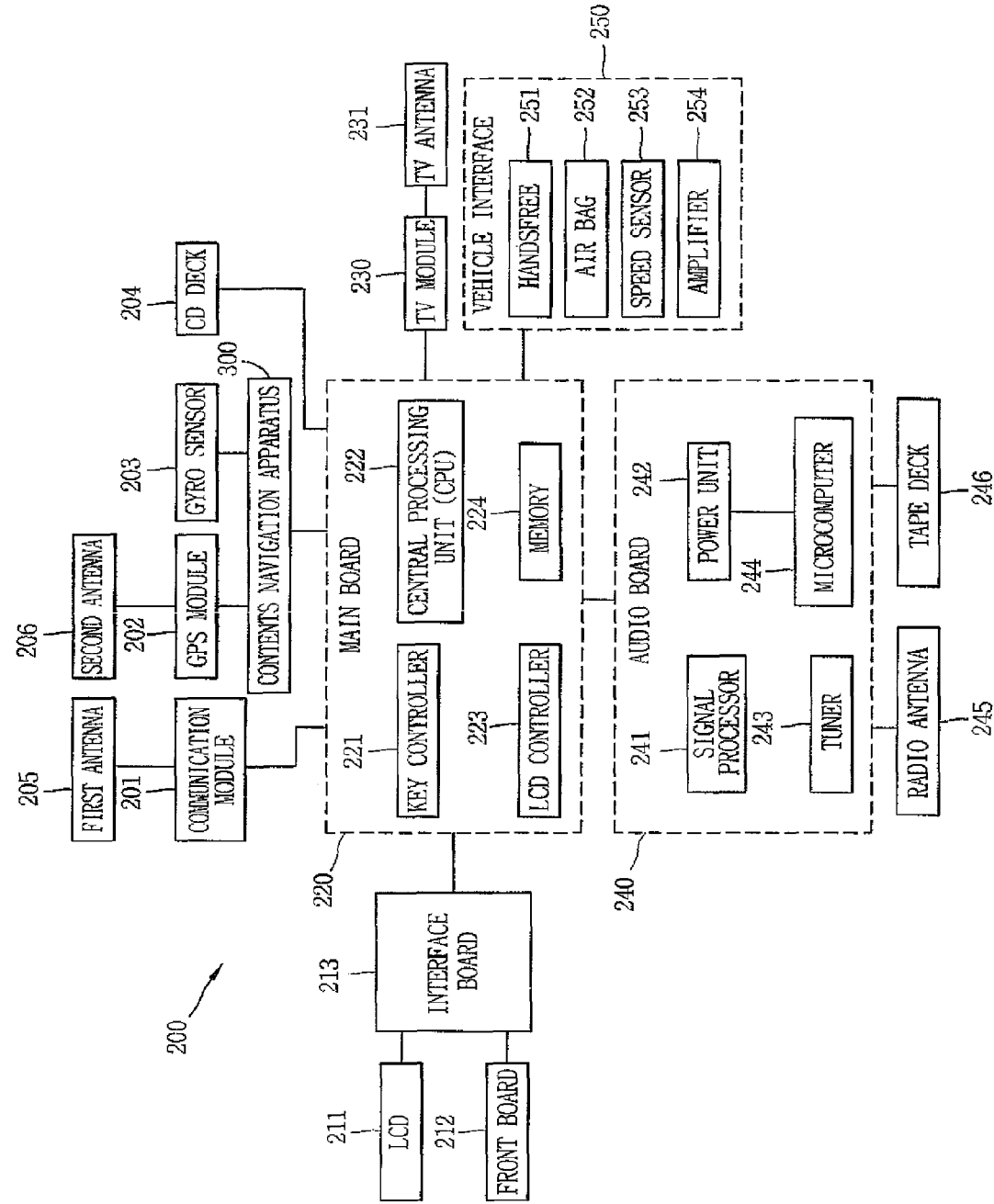
FIG. 2 is a schematic block diagram showing a configuration of a telematics terminal.

FIG. 2 is a block diagram showing a configuration of a telematics terminal 200. The telematics terminal 200 illustrates one exemplary configuration of a telematics terminal that may be used to carryout the functionality described in more detail below. In various implementations, a different configuration of a telematics terminal with other components may be used.

Referring to FIG. 2, the telematics terminal 200 may include a main board 220. The main board 220 includes a central processing unit (CPU) 222 for controlling overall operation of the telematics terminal 200, a key controller 221 for controlling a variety of key signals, an LCD controller 223 for controlling an LCD, and memory 224 for storing various kinds of information. In particular, the memory 224 stores map information (map data) for displaying vehicle guidance information (e.g., road guidance information for the user while the user is driving or not driving a vehicle) on a map of the display unit (e.g., LCD 211). In addition, the memory 224 stores a traffic information collection and control algorithm for allowing inputting of traffic information according to a present condition of a road on which the vehicle is currently traveling by a user.

The main board 220 may include a communication module 201 provided with a uniquely given device number. The communication module 201 may be configured to perform a voice call and data transmission and/or reception through a mobile terminal built in a vehicle and may include a GPS module 202 for receiving a GPS signal to guide a position of a vehicle, track a traveling route from a depart point to an arrival point, generating current position data of a vehicle based on the received GPS signal, or transmitting traffic information collected by a user as a GPS signal. The communication module 201 may also include a gyro sensor 203 for sensing a running direction of the vehicle, a CD deck 204 for reproducing a signal recorded on a compact disk (CD), and other modules. The communication module 201 and the GPS module 202 transmit and/or receive signals through a first antenna 205 and a second antenna 206, respectively.

The main board 220 is connected to a TV module 230 for receiving a broadcast signal via a broadcast signal antenna (or TV antenna). The main board 220 is connected to an LCD display unit 211 controlled by the LCD controller 223 via an interface board 213. The LCD 211 processes a broadcasting signal received through the TV module 230 and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223. As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected to the main board 220, and processes a variety of audio signals. The audio board 240 may include a microcomputer 244 for controlling the audio board 240, a tuner 243 for receiving a radio signal through an antenna (or radio antenna) 245, a power supply unit 242 for supplying power to the microcomputer 244, and a signal processing unit 241 for processing a variety of voice signals. The audio board 240 is connected to a radio antenna 245 for receiving radio signals, and a tape deck 246 for reproducing an audio tape. The audio board 240 is connected to an amplifier 254 for outputting audio signals that are processed in the audio board 240.

The amplifier 254 is connected to a vehicle interface 250. That is, the main board 220 and the audio board 240 are connected to the vehicle interface 250. A hands-free unit 251 for inputting an audio signal without the user having to use their hands to input information, an airbag 252 for providing passenger's safety, and a speed sensor 253 for sensing a vehicle speed are also included in the vehicle interface 250. In addition, the speed sensor 253 calculates a vehicle speed, and provides information relating to the calculated vehicle speed to the CPU 222. The function of the navigation session 300 applied to the telematics terminal 200 can include general navigation functions, such as, providing driving directions to the user.

Meanwhile, the CPU 222 applied to the telematics terminal 200 can transmit information displayed on the telematics terminal 200 to a particular terminal connected to the telematics terminal 200, match information (e.g., control information) transmitted from the particular terminal to information displayed on the mobile telematics terminal 200 to perform a function corresponding to the matching results, display the information displayed on the telematics terminal 200 also on the particular terminal, and control the function of the telematics terminal 200.

In the following description, a mobile terminal system in which a first mobile terminal 400 is employed as the mobile communication terminal 100 will is described with reference to FIG. 3. However, the first mobile terminal 400 can be applicable to the telematics terminal 200 as well as to the mobile communication terminal 100.

Figure 3:
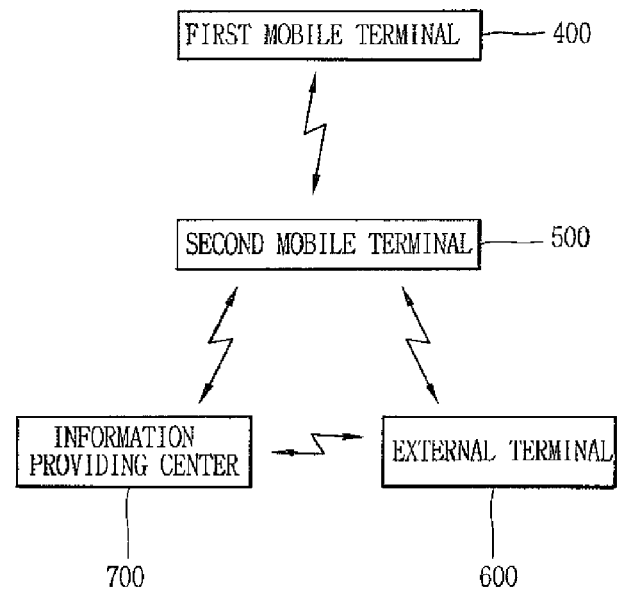
FIG. 3 is a schematic block diagram showing a configuration of a mobile terminal system.

FIG. 3 is a schematic block diagram showing the configuration of a mobile terminal. As shown in FIG. 3, the mobile terminal system includes a first mobile terminal 400, a second mobile terminal 500, an external terminal 600, and an information providing center 700.

The first mobile terminal 400 is connected with the second mobile terminal 500 according via wireline or wireless communication. The first mobile terminal 400 may receive data from the second mobile terminal 500 and the first mobile terminal 400 may output the data. Among the outputted data, the first mobile terminal 400 may transmit, to the second mobile terminal 500, information regarding a function selected by the user. The transmitted information may include coordinate information regarding a function selected correspondingly according to a screen image of a graphic user interface (GUI) or the like, coordinate information regarding a function selected correspondingly according to a menu screen, control information corresponding to the selected function, or various other control signals.

The first mobile terminal 400 may receive various information (e.g., image data, voice data, various control signals, etc.) transmitted from the external terminal 600 or the information providing center connected with the second mobile terminal 500. The first mobile terminal 400 may also process (e.g., decoding and/or scaling) the received information into certain signals, and output the processed information.

The first mobile terminal 400 may be directly connected with the external terminal 600 or the information providing center 700 via wireline or wireless communication. The first mobile terminal 400 may be connected with a vehicle via wireline or wireless communication. The first mobile terminal 400 may receive function execution results or road guidance information transmitted from the second mobile terminal 500 and output the received function execution results or road guidance information. The first mobile terminal 400 may receive signals from the second mobile terminal 500 and can, in turn, transmit a control signal including information such as a start ON/OFF, door ON/OFF, etc. to the vehicle to control starting or the door of the vehicle.

The second mobile terminal 500 can be connected with one or more of the first mobile terminal 400, the external terminal 600, the information providing center 700, via wireline or wireless communication. The second mobile terminal 500 may output information (or data) including at least one of a screen image (e.g., a menu screen) such as a UI, a GUI, image data, voice data, and a control signal according to execution results of a application programs executed in the second mobile terminal 500, or can transmit the same to the first mobile terminal 400 connected thereto.

The second mobile terminal 500 may perform a particular function based on information (e.g., coordinate information regarding a function selected correspondingly according to a screen image of a GUI or the like, coordinate information regarding a function selected correspondingly according to a menu screen, or control information corresponding to the selected function) regarding the particular function transmitted from the first mobile terminal 400. The second mobile terminal 500 may output results obtained by performing the function and transmit the same to the first mobile terminal 400 connected thereto. The second mobile terminal 500 may transmit various information that has been received from the external terminal 600 or the information providing center 700 to the first mobile terminal 400.

When the data outputted by the second mobile terminal 500 is changed, the second mobile terminal 500 transmits the changed data to the first mobile terminal 400. Then, the first mobile terminal 400 outputs the received changed data. The second mobile terminal 500 may output a pre-set function based on vehicle state information transmitted from the first mobile terminal 400 and outputs the function execution results and, at the same time, transmit the same to the first mobile terminal 400.

The second mobile terminal 500 may generate a control signal (e.g., information such as start ON/OFF, door ON/OFF, etc.) for controlling the vehicle connected with the first mobile terminal 400, and may transmit the generated control signal to the first mobile terminal 400. The first mobile terminal 400 or the second mobile terminal 500 may include a smart phone, a portable terminal, a mobile terminal, a PDA (Personal Digital Assistant), a notebook computer, a WiBro terminal, an IPTV (Internet Protocol Television) terminal, a television, a telematics terminal, a navigation terminal, or an AVN (Audio Video Navigation) terminal. As for the mutually connected first and second mobile terminals, the results obtained by the second mobile terminal 500 can be shared with the first mobile terminal 400 and the second mobile terminal 500 can perform a function selected by the first mobile terminal 400, thereby extending the function of the second mobile terminal 500.

In addition, results of an application program included in the second mobile terminal 500 can be displayed, rendered, or otherwise output from the first mobile terminal 400 through its connection to the second mobile terminal 500. Also, information regarding a function selected by the user from data outputted from the first mobile terminal 400 can be transmitted to the second mobile terminal 500 to allow the second mobile terminal 500 to perform the corresponding function. As such, the first mobile terminal 400 can receive the results obtained by performing the corresponding function from the second mobile terminal 500 even if the first mobile terminal 400 does not have an application program including the selected function.

Also, the second mobile terminal 500 may receive vehicle state information through the first mobile terminal, execute a pre-set function based on the received vehicle state information, display the function execution results on the second mobile terminal 500, and transmit the same to the first mobile terminal 400.

The external terminal 600 can be a terminal located at a remote area from the first and second mobile terminals 400 and 500. The external terminal 600 may be a smart phone, a portable terminal, a mobile terminal, a PDA (Personal Digital Assistant), a notebook computer, a WiBro terminal, an IPTV (Internet Protocol Television) terminal, a television, a telematics terminal, a navigation terminal, an AVN (Audio Video Navigation) terminal, etc. The external terminal 600 may be connected for communication with the first mobile terminal 400 or the second mobile terminal 500 to transmit or receive various information (e.g., image data, voice data, a control signal, or a voice call signal).

The information providing center 700 may be configured to continuously update state information of each road. The state information can include map data or lane information of each road, and/or TPEG information, such as, information about the amount of vehicle traffic. The information providing center 700 can, in turn, transmit the state information to the terminals at pre-set time intervals or when update information is requested by terminals (e.g., requested by the first mobile terminal 400, the second mobile terminal 500, or the external terminal 600). When the first mobile terminal 400, the second mobile terminal 500, the external terminal 600, and the information providing center 700 are connected for communication via wireline or wireless communication, an authentication procedure may be performed to allow authenticated terminals to be connected for communication.

Figure 4:
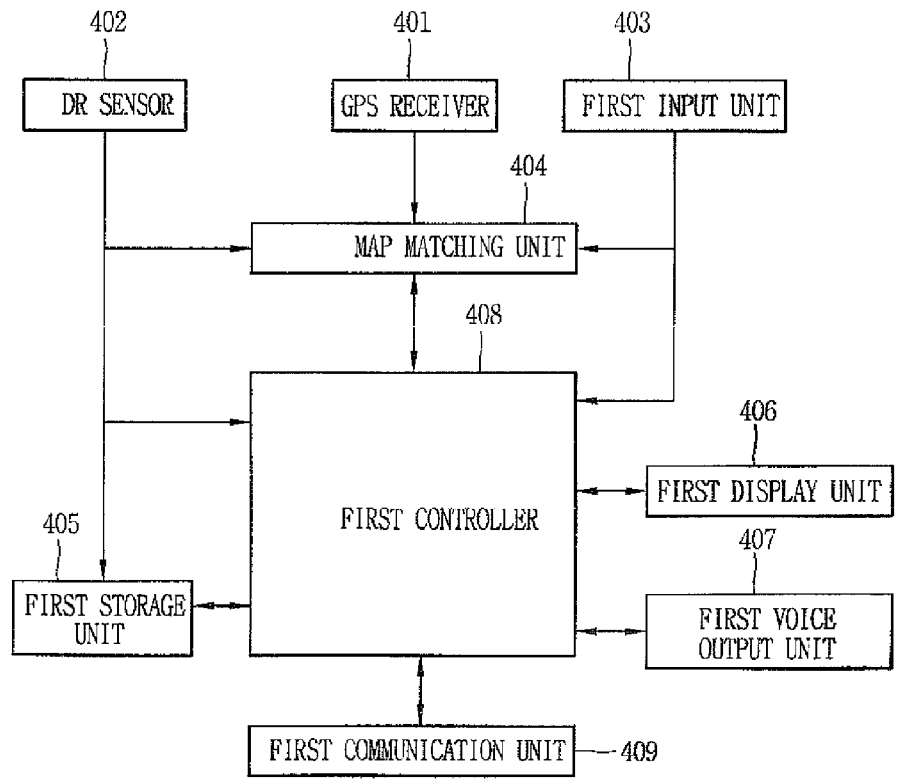
FIG. 4 is a schematic block diagram showing a configuration of a first mobile terminal.

FIG. 4 is a schematic block diagram showing the configuration of a first mobile terminal. As shown in FIG. 4, the first mobile terminal 400 includes a GPS receiver 401, a DR (Dead-Reckoning) sensor 402, a first input unit 403, a map matching unit 404, a first storage unit 405, a first display unit 406, a first voice output unit 407, a first controller 408, and a first communication unit 409.

The GPS receiver 401 can receive a GPS signal transmitted from a satellite, generate first location data of the first mobile terminal 400 (regarded as the same location as the telematics terminal 200 or the mobile communication terminal 100) in real time based on longitude coordinates or latitude coordinates included in the GPS signal, and can output the generated first location data to the map matching unit 404. Here, the first location data is defined as a current location (or current location data) of the first mobile terminal 400. The location information may be received through Wi-Fi or WiBro communication as well as by the GPS receiver 401.

The signal received through the GPS receiver 401 may provide terminal location information to the first mobile terminal 400 using a wireless communication scheme such as 802.11, a standard of the wireless network for a WLAN including wireless LAN, some infrared communication, 802.15, a standard for a wireless personal area network (PAN) including Bluetooth™, UWB, ZigBee, 802.16, a standard for a wireless metropolitan area network (MAN) including a fixed wireless access (FWA), broadband wireless access (BWA), 802.20, and a standard for the mobile Internet with respect to a mobile broadband wireless access (MBWA) including WiBro, and WiMAX, proposed by the Institute of Electrical and Electronics Engineers.

The DR sensor 402 (or a sensor unit) measures a traveling direction and the speed of the vehicle in which the first mobile terminal 400 is provided, generates second location data based on the measured traveling direction and speed of the vehicle, and outputs the generated second location data to the map matching unit 404. The DR sensor 402 outputs the measured traveling direction and speed information of the vehicle to the first storage unit and to the first controller 408.

The first input unit 403 may received input by the user (e.g., a button manipulation) or a command or a control signal according to manipulation such as a touch or scrolling of a displayed screen image. Also, the first input unit 403 selects a user desired function or receives information. Various devices can be used as the first input unit 403, including, for example, a keypad, a touch screen, a jog shuttle, or a microphone. Also, the first input unit 403 may include one or more cameras and/or microphones and output image data and/or voice data inputted through the camera and/or microphone to the first display unit 406 and/or to the first voice output unit 407, or may output the image data and/or voice data inputted through the camera and/or microphone to a particular terminal (e.g., the second mobile terminal 500, the external terminal 600, or the information providing center 700).

The map matching unit 404 generates an estimated location of the first mobile terminal 400 based on the first location data and the second location data and reads map data corresponding to a traveling route from the first storage unit 405. Also, the map matching unit 404 matches the estimated location of the mobile terminal to a link (road) included in the map data, and outputs the matched map data (i.e., the map matching results) to the first controller 408. For example, the map matching unit 404 generates the estimated location of the mobile terminal based on the first location data and the second location data, matches the generated estimated location of the mobile terminal to links in the map data stored in the first storage unit 405 according to the link order, and outputs the matched map information (i.e., the map matching results) to the first controller 408.

Also, the map matching unit 404 outputs road attribute information, such as a single-storied road, a dual-stored road, or the like, included in the matched map information (map matching results) to the first controller 408. The function of the map matching unit 404 may be implemented in the first controller 408.

The first storage unit 405 stores the map data. In this case, the stored map data includes geographic coordinates representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, and the like, may be also used as the stored map data. Also, the first storage unit 405 stores information regarding various menu screen images, point of interests (POI), and function characteristics information according to a particular location of map data. Also, the first storage unit 405 stores data, programs, and the like, required for the first mobile terminal 400 to operate.

Also, the first storage unit 405 stores destination information inputted from the user through the first input unit 403. In this case, the destination information may be a destination or may be one of a start point and a destination. Further, the first storage unit 405 stores information regarding a road state (or traffic information) and the amount of passage of vehicles using TPEG information, various state information (or route search supplementary information) of each road or other information. In addition, the first storage unit 405 stores the traveling direction of the vehicle and the speed information of the vehicle measured by the DR sensor 402.

The first display unit 406 displays image information (e.g., a road guidance map) included in the road guidance information generated by the first controller 408. Here, the first display unit 406 may be a touch screen. The road guidance information may include various information in relation to traveling such as lane information, running limit speed information, turn-by-turn information, traffic safety information, traffic guidance information, vehicle information, road search information, as well as the map data.

When displaying the image information, the first display unit 406 may display various menu screen images, road guidance information, and the like, using a UI or GUI included in the storage unit 405. Here, the contents displayed on the first display unit 406 may include various text or image data (e.g., map data or various information data), and a menu screen image including icons, list menus, combo boxes, or other selection means.

Also, the first display unit 406 processes the data included in the information received via the first communication unit 409 under the control of the controller 408, and displays the processed data. The displayed data may be various contents such as various image information, various menu screen images, road guidance information, and the like. The first display unit 406 processes the data included in the vehicle state information received via the first communication unit 409 under the control of the first controller 408, and displays the processed data.

The first voice output unit 407 outputs voice information included in road guidance information (or a voice message with respect to the road guidance information) generated by the first controller 408. Here, the first voice output unit 407 may be a speaker. Also, the first voice output unit 407 converts various information according to control results of the first controller 408 into voice and outputs the same. In addition, the first voice output unit 407 processes voice data included in the information received via the first communication unit 409 under the control of the first controller 408, and then outputs the processed voice data under the control of the first controller 408.

Also, the first voice output unit 407 processes the data included in the vehicle state information received via the first communication unit 409 under the control of the first controller 408, and then outputs the processed voice data. The first controller 408 receives real time traffic information from the information providing center 700. The received real time traffic information is used when the road guidance information is generated. Further, the first controller 408 performs route searching based on a starting point and a destination or based on a destination and outputs the route search results to the first display unit 406. The first controller 408 generates the road guidance information based on the matched map information and outputs the generated road guidance information to the first display unit 406 and to the first voice output unit 407. Then, the first display unit 406 displays the road guidance information.

Also, the first controller 408 provides control to display a current location of the first mobile terminal 400 on the map data displayed on the first display unit 406 according to the generated road guidance information. The first controller 408 transmits information regarding the current location of the first mobile terminal 400 to the second mobile terminal 500 via the first communication unit 409. The first controller 408 processes (e.g., decoding and/or scaling) information (e.g., screen images, such as a UI or GUI image, image data, voice data, or a control signal) transmitted from the second mobile terminal 500 and then outputs the processed information to the first display unit 406 and/or to the first voice output unit 407. Also, the first controller 408 may generate performing results based on the processed control signal and output the performing results to the first display unit 406 and/or to the first voice output unit 407 or to the second mobile terminal 500 via the first communication unit 409.

Also, the first controller 408 may transmit information regarding coordinates selected by a user input or function information (or control information), information regarding a menu button corresponding to the selected coordinates. The information transmitted by the first controller 408 may be information among the data (e.g., a menu screen image using the UI or the GUI, or image data) outputted via the first display unit 406, to the second mobile terminal 500 via the first communication unit 409.

The first controller 408 can receive control results performed based on the selected coordinates or function information regarding the menu button corresponding to the selected coordinates which have been transmitted from the second mobile terminal 500 via the first communication unit 409, and can control the first display unit 406 and/or the first voice output unit 407 to output the received control results. Also, the first controller 408 may generate a control signal corresponding to the coordinates selected by the user input among the data (e.g., a menu screen image using the UI or the GUI) outputted via the first display unit 406, and transmit the generated control signal to the second mobile terminal 500 via the first communication unit 409.

The first controller 408 receives the vehicle state information transmitted from the vehicle (not shown) connected with the first mobile terminal 400, processes the received vehicle state information, and outputs the same to the first display unit 406 and/or to the first voice output unit 407. The first controller 408 transmits the received vehicle state information to the second mobile terminal 500 via the first communication unit 409. The first controller 408 process information (e.g., function performing results previously set according to the vehicle state information, road guidance information) transmitted from the second mobile terminal 500 and outputs the processed information to the first display unit 406 and/or the first voice output unit 407. Also, the first controller 408 transmits a control signal (e.g., start ON/OFF or door ON/OFF information of the vehicle) transmitted from the second mobile terminal to the vehicle.

The first communication unit 409 may include a wireless Internet module or a short-range communication module. The wireless Internet module may be based on virtual network computing (VNC), WLAN, Wi-Fi, wireless broadband (WiBro), world interoperability for microwave access (WiMAX), high speed downlink packet access (HSDPA), or other form of communication, while the short-range communication module may be based on Bluetooth™, RFID, infrared communication, UWB, ZigBee, or other forms of communication. The first communication unit 409 may include a universal serial bus (USB) module.

Some or all of the GPS receiver 401, the DR sensor 402, the first input unit 403, the map matching unit 404, the first storage unit 405, the first display unit 406, the first voice output unit 407, the first controller 408, and the first communication unit 409 provided in the first mobile terminal 400 as described above with reference to FIG. 4 according may be implemented by those elements having a similar function in the mobile communication terminal 100. Namely, the GPS receiver 401 may be the location information module 115 of the mobile communication terminal 100, the DR sensor 402 may be the sensing unit 140 of the mobile communication terminal 100, the first input unit 403 may be the user input unit 130 of the mobile communication terminal 100, the first storage unit 405 may be the memory 160 of the mobile terminal, the first display unit 406 may be the display unit 151 of the mobile communication terminal 100, the first voice output unit 407 may be the audio output module 152 of the mobile communication terminal 100, and the first communication unit 409 may be the wireless communication unit 110 of the mobile communication terminal 100. Also, the functions of the map matching unit 404 and the first controller 408 may be performed by the controller 180 of the mobile communication terminal 100. In addition, the functions of the map matching unit 404 and the first controller 408 may be implemented as a single module in the mobile terminal.

Some or all of the GPS receiver 401, the DR sensor 402, the map matching unit 404, the first storage unit 405, the first display unit 406, the first voice output unit 407, the first controller 408, and the first communication unit 409 provided in the first mobile terminal 400 as described above with reference to FIG. 4 may be implemented by elements having a similar function in the telematics terminal 200. Namely, the GPS receiver 401 may be the GPS module 202 of the telematics terminal 200, the DR sensor 402 may be the gyro sensor 203 of the telematics terminal 200, the first storage unit 405 may be the memory 224 of the telematics terminal 200, the first display unit 406 may be the LCD 211 of the telematics terminal, the first voice output unit 407 may be the amplifier 254 of the telematics terminal 200. The first communication unit 409 may be the communication module 201 of the telematics terminal 200. The function of the map matching unit 404 and the first controller 408 may be executed by the CPU 222 of the telematics terminal 200.

Figure 5:
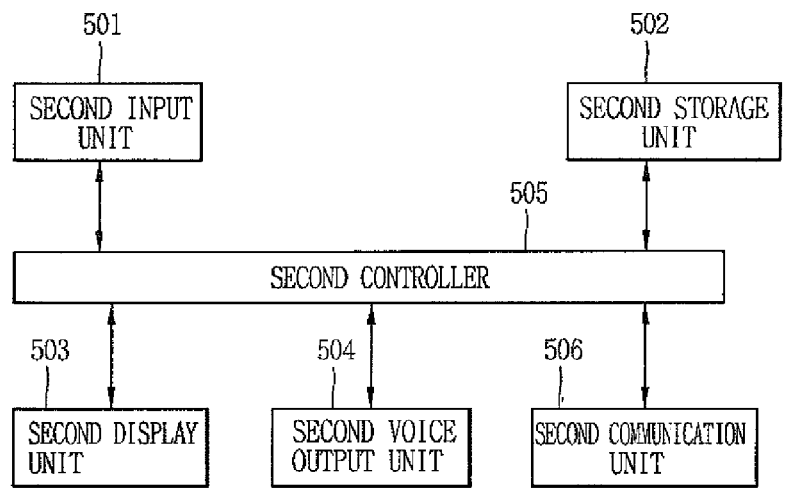
FIG. 5 is a schematic block diagram showing a configuration of a second mobile terminal.

FIG. 5 is a schematic block diagram showing the configuration of a second mobile terminal. As illustrated, the second mobile terminal 500 includes a second input unit 501, a second storage unit 502, a second display unit 503, a second voice output unit 504, a second controller 505, and a second communication unit 506.

The second input unit 501 can receive a button manipulation by the user or receive a command or a control signal according to manipulation such as a touch or scrolling of a displayed screen image. Also, the second input unit 501 can select a user desired function or receive information. Various such as a keypad, a touch screen, a jog shuttle, a microphone, and the like, can be used as the second input unit 501. Also, the second input unit 501 may include one or more cameras and/or microphones and output image data and/or voice data inputted through the camera and/or microphone to the second display unit 503 and/or to the second voice output unit 504, or may output the image data and/or voice data inputted through the camera and/or microphone to a particular terminal (e.g., the first mobile terminal 400, the external terminal 600, or the information providing center 700) through the second communication unit 506.

The second storage unit 502 stores the map data. In this case, the stored map data includes geographic coordinates representing the latitude and longitude by DMS unit. Here, besides the geographic coordinates, UTM coordinates, UPS coordinates, TM coordinates, and the like, may be also used as the stored map data. The second storage unit 502 stores information regarding various menu screen images, a POI, and function characteristics information according to a particular location of map data. The second storage unit 502 stores various UIs and/or GUIs. The second storage unit 502 also stores data, programs, and the like, required for the second mobile terminal 500 to operate. Moreover, the second storage unit 502 stores information regarding a road state (or traffic information) and the amount of passage of vehicles using TPEG information, various state information (or route search supplementary information) of each road, or other information. The second storage unit 502 stores data transmitted from the first mobile terminal 400.

The second storage unit 502 displays image information (e.g., road guidance map) included in the road guidance information generated by the first controller 408. Here, the second storage unit 502 may be a touch screen. The road guidance information may include various information in relation to traveling such as lane information, running limit speed information, turn-by-turn information, traffic safety information, traffic guidance information, vehicle information, road search information, as well as the map data.

When displaying the image information, the second storage unit 502 may display various menu screen images, road guidance information, and the like, using a UI or GUI included in the storage unit 405. Here, the contents displayed on the second storage unit 502 may include various text or image data (e.g., map data or various information data), and a menu screen image including icons, list menus, combo boxes, or other selection means.

Also, the second storage unit 502 processes the coordinate data included in the information received via the second communication unit 506, and activates coordinates corresponding to the processed coordinate information. For example, if the coordinates included in the information received via the second communication unit 506 corresponds to A button displayed on the second display unit 503, the second controller 505 provides control to match the coordinates included in the received information to the coordinates corresponding to the A button displayed on the second display unit 503 to display an emoticon or the like in an arrow shape or a finger shape at the position of the A button of the second display unit 503 in order to display the selected A button in an activated state on the second display unit 503. Also, the second display unit 503 processes the data included in the vehicle state information received via the second communication unit 506 under the control of the second controller 505, and displays the processed data.

The second voice output unit 504 outputs voice information included in road guidance information (or a voice message with respect to the road guidance information) generated by the second controller 505. Here, the second voice output unit 504 may be a speaker. The second voice output unit 504 converts various information according to control results of the second controller 505 into voice and outputs the same. Also, the second voice output unit 504 processes the data included in the vehicle state information received via the second communication unit 506 under the control of the second controller 505, and then outputs the processed voice data.

The second controller 505 generates an estimate location of the first mobile terminal based on the location data of the first mobile terminal 400 received via the second communication unit 506, and reads map data corresponding to a traveling route from the second storage unit 502. Also, the second controller 505 matches the estimated location of the first mobile terminal to a link (road) included in the map data. For example, the second controller 505 generates the estimated location of the first mobile terminal 400 based on the received location information of the first mobile terminal 400, matches the generated estimated location of the first mobile terminal 400 to links in the map data stored in the second storage unit 502 according to the link order. The second controller 505 outputs road attribute information such as a single-storied road, a dual-stored road, or the like, included in the matched map information (map matching results).

Also, the second mobile terminal 500 further includes a GPS receiver (not shown) so as to be configured to generate location data of the second mobile terminal 500 in real time based on a GPS signal received via the GPS receiver and output the generated first location data to the second controller 505. The second controller 505 generates an estimated location of the second mobile terminal 500 based on the outputted first location data, and reads map data corresponding to a traveling route from the second storage unit 502. The second controller 505 matches the estimated location of the second mobile terminal 500 to a link (road) included in the map data. The second controller 505 receives real time traffic information from the information providing center 700. The received real time traffic information is used when the road guidance information is generated.

Additionally, the second controller 505 may be connected with the first mobile terminal 400, the external terminal 600, and the information providing center 700 via the second communication unit 506 through wireline or wireless communication to perform call communication or transmit or receive various data. The second controller 505 performs route searching based on a starting point and a destination or based on a destination and outputs the route search results to the second display unit 503. The second controller 505 generates the road guidance information based on the matched map information and outputs the generated road guidance information to the second display unit 503 and to the second voice output unit 504. Then, the second display unit 503 displays the road guidance information.

Further, the second controller 505 transmits the generated road guidance information to the connected first mobile terminal 400 via the second communication unit 506, approximately concurrently when it outputs the generated road guidance information to the second display unit 503 and to the second voice output unit 504. The second controller 505 outputs various menu screen images stored in the second storage unit 502, such as, various UIs and/or GUIs, application program performing results, and the like to the second display unit 503 and to the second voice output unit 504, and also approximately concurrently transmits the same to the connected first mobile terminal 400 via the second communication unit 506. In this manner, the information outputted to the second mobile terminal 500 may be concurrently outputted to the first mobile terminal 400.

The second controller 505 may be configured to match the coordinate information included in the information received via the second communication unit 506 to coordinates displayed on the second display unit 503 and display the matching results on the second display unit 503. The second controller 505 may execute the function corresponding to a control signal included in information received via the second communication unit 506, and output the function execution results to the second display unit 503 and/or to the second voice output unit 504 and, approximately concurrently, to the first mobile terminal 400 via the second communication unit 506. The second controller 505 receives vehicle state information transmitted from the first mobile terminal 400, executes a pre-set function based on the received state information, and outputs the function execution results to the second display unit 503 and/or to the second voice output unit 504.

Also, the second controller 505 generates road guidance information based on the received vehicle state information and outputs the generated road guidance information to the second display unit 503 and/or to the second voice output unit 504. The second controller 505 transmits the function execution results or the road guidance information to the first mobile terminal 400 via the second communication unit 506. The second controller 505 generates a control signal (e.g., start ON/OFF or door ON/OFF information of the vehicle) for controlling the vehicle (not shown) connected with the first mobile terminal 400, and transmits the generated control signal to the first mobile terminal 400 via the second communication unit 506.

The second communication unit 506 may include a wireless Internet module or a short-range communication module. The wireless Internet module may be based on virtual network computing (VNC), WLAN, Wi-Fi, wireless broadband (WiBro), world interoperability for microwave access (WiMAX), high speed downlink packet access (HSDPA), or other forms of communication and the short-range communication module may be based on Bluetooth™, RFID, infrared communication, UWB, ZigBee, or other forms of communication.

FIG. 5 is a schematic block diagram showing the configuration of a second mobile terminal. As illustrated, the second mobile terminal 500 includes the second input unit 501, the second storage unit 502, the second display unit 503, the second voice output unit 504, the second controller 505, and the second communication unit 506.

Some or all of the second input unit 501, the second storage unit 502, the second display unit 503, the second voice output unit 504, the second controller 505, and the second communication unit 506, provided in the second mobile terminal 500 as described above with reference to FIG. 5 may be implemented by those elements having a similar function in the mobile communication terminal 100. Namely, the second input unit 501 may be the user input unit 130 of the mobile communication terminal 100, the second storage unit 502 may be the memory 160 of the mobile terminal, the second display unit 503 may be the display unit 151 of the mobile communication terminal 100, the second voice output unit 504 may be the audio output module 152 of the mobile communication terminal 100, and the second controller 505 may be the controller 180 of the mobile communication terminal 100, and the second communication unit 506 may be the wireless communication unit 110 of the mobile communication terminal 100.

Some or all of the second input unit 501, the second storage unit 502, the second display unit 503, the second voice output unit 504, the second controller 505, and the second communication unit 506, provided in the second mobile terminal 500 as described above with reference to FIG. 5 may be implemented by those elements having a similar function in the telematics terminal 200. Namely, the second storage unit 502 may be the memory 224 of the telematics terminal 200, the second display unit 503 may be the LCD 211 of the telematics terminal, the second voice output unit 504 may be the amplifier 254 of the telematics terminal 200, the second controller 505 may be the CPU 222 of the telematics terminal 200, and the second communication unit 506 may be the communication module 201 of the telematics terminal 200.

The following description references processes for controlling mobile terminals and/or communication using mobile terminals according to various implementations. Although the process described below reference elements discussed above, this referencing is exemplary. Other elements may be used in conjunction with carrying out the processes described below or portions thereof.

Figure 6:
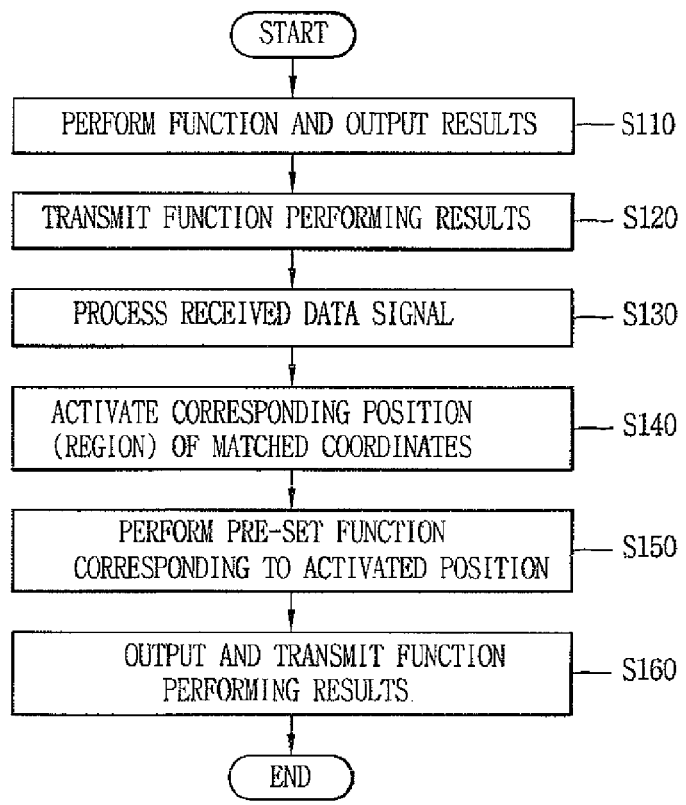
FIG. 6 is a flow chart of a first process for controlling a mobile terminal.

FIG. 6 is a flow chart of a first process for controlling a mobile terminal. In the process, a function is performed and results are output (S110). In particular, the second controller 505 executes a function (or an application program) stored in the second storage unit 502 of the second mobile terminal 500, and provides control to output the function execution results (or data according to the function execution results) to the second display unit 503 and/or to the second voice output unit 504. In this case, the data (information) according to the function execution results may include screen images (e.g., various menu screen images) such as UIs or GUIs, image data, voice data, and the like, stored in the second storage unit 502. For example, the second controller 505 executes the function of a phone book stored in the second storage unit 502 to display a phone book screen image 511 according to the function execution on the second display unit 503.

Thereafter, the results of performing the function are transmitted (S120). In particular, the second controller 505 transmits data according to the function execution results outputted via the second display unit 503 and/or via the second voice output unit 504 to the connected first mobile terminal 400. The transmission may be via wireline or wireless communication, such as a VNC, USB, Wi-Fi, Bluetooth™, RFID, infrared communication, UWB, ZigBee, or other communication. When transmitting the data according to the function execution results, the second controller 505 may also transmit video codec setting information (e.g., codec setting information related to a screen setting, audio codec setting information) of the second mobile terminal 500 to the first mobile terminal 400.

Next, the received data signal is processed (S130). In particular, the second controller 505 receives data transmitted from the connected first mobile terminal 400 and processes (e.g., decoding and/or scaling) the received data. In this case, the data transmitted from the first mobile terminal 400 may include coordinate information regarding the function selected correspondingly according to a UI or GUI screen image, coordinate information regarding the selected function according to a menu screen image, control information corresponding to the selected function, image data, voice data, video codec setting information (e.g., the codec setting information related to the screen setting, the audio codec setting information, etc.) of the first mobile terminal 400, or various control signals.

Also, if the data transmitted from the connected first mobile terminal 400 includes coordinate information (e.g., coordinate information corresponding to the UI or GUI screen image or coordinate information corresponding to the menu screen image), the second controller 505 processes the received data and matches the coordinate information included in the processed data to the coordinates of the data displayed on the second display unit 503.

Thereafter, the position or region corresponding to matched coordinates is activated (S140). In particular, the second controller 505 provides control to activate a location (or region) corresponding to the matched coordinates in the data displayed on the second display unit 503. Also, the second controller 505 may provide control to display an emoticon in a mouse shape or a finger shape stored in the second storage unit 502 at a location (region) corresponding to the matched coordinates.

Figure 7A:
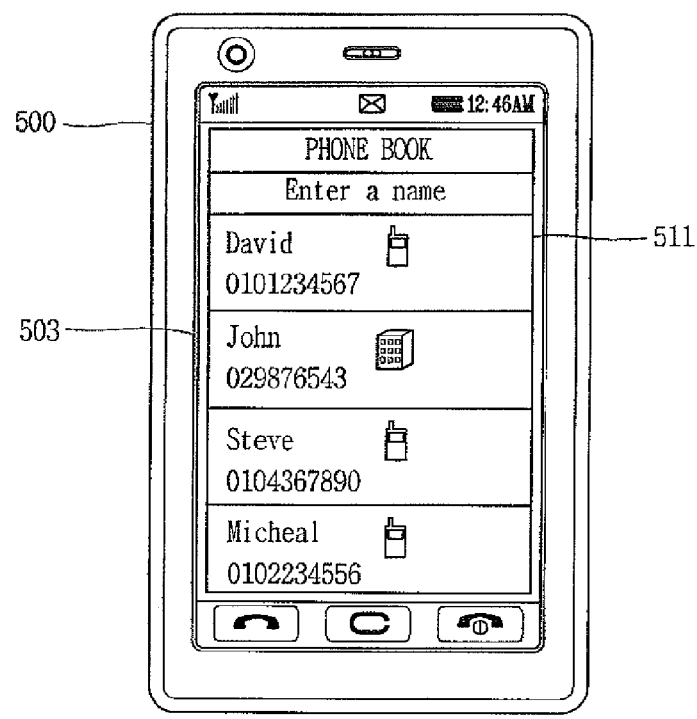
FIGS. 7A and 7B are overviews of display screens of mobile terminals generated with the first process.
Figure 7B:
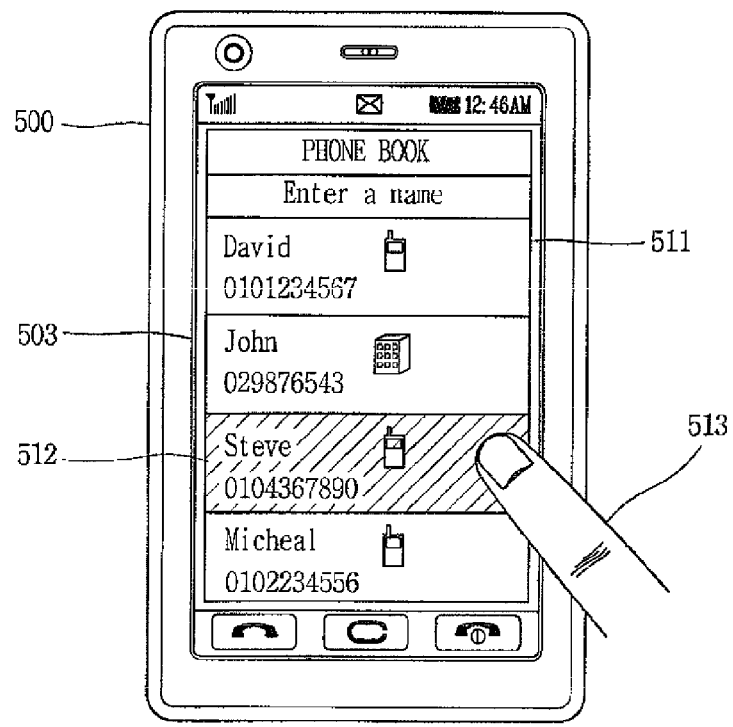

For example, as shown in FIG. 7B, if the coordinate information included in the data transmitted from the first mobile terminal 400 is matched to a 'phone number region of Steve' on the phone book screen image 511 displayed on the second display unit 503, the second controller 505 may provide control to activate the region of 'Steve' (512) or display a finger shape on the region of 'Steve' (513) in order to indicate that the region of 'Steve' has been selected from the phone book screen image 511 displayed on the second display unit 503. In this case, the activation state or the finger shape display state may be maintained for a pre-set time duration or may be maintained until when additional state information is inputted.

A pre-set function corresponding to the activated position is performed (S150). In particular, the second controller 505 executes a pre-set function correspondingly according to the activated location (region). For example, as shown in FIG. 7B, if the activated region is the region of 'Steve', the second controller 505 performs a communication connection to the external terminal 600 having a phone number previously stored in relation to the region of 'Steve'.

Thereafter, the results of performing the function are outputted and transmitted (S160). In particular, the second controller 505 outputs the function execution results to the second display unit 503 and/or to the second voice output unit 504 and transmits the function execution results to the first mobile terminal 400 via the second communication unit 506. For example, if a communication connection with the external terminal 600 having the phone number corresponding to the region of 'Steve' is performed, the second controller 505 processes data (e.g., image data, voice data, or a control signal) transmitted from the external terminal 600 and outputs the same to the second display unit 503 and/or to the second voice output unit 504 and, approximately concurrently, transmits the data transmitted from the external terminal 600 to the first mobile terminal 400 via the second communication unit 506.

Figure 8:
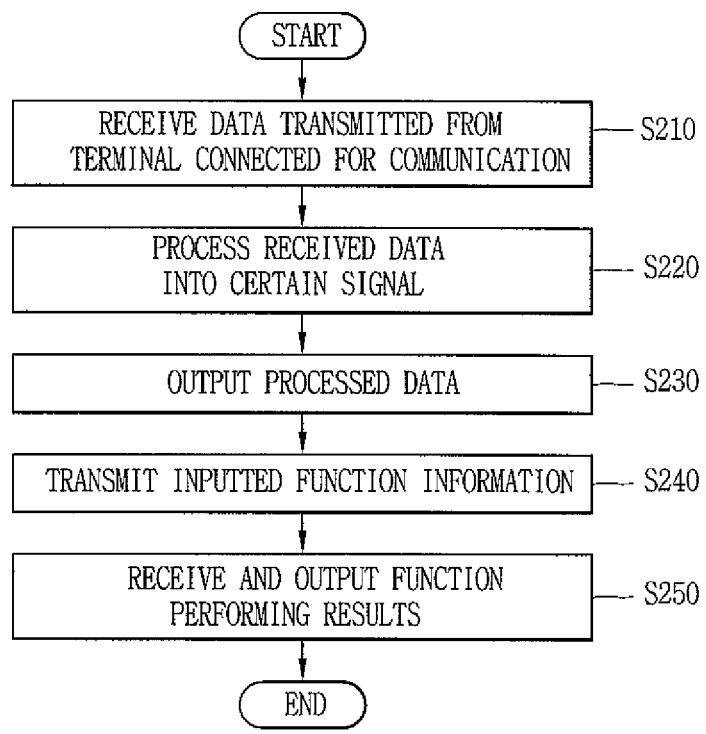
FIG. 8 is a flow chart of a second process for controlling a mobile terminal.

FIG. 8 is a flow chart of a second process for controlling a mobile terminal. The first controller 408 performs communication connection with the second mobile terminal 500 via the first communication unit 409. In this case, the first communication unit 409 may be connected for communication with the second mobile terminal 500 by via wireline or wireless communication, such as VNC, a USB, Wi-Fi, Bluetooth™, RFID, infrared communication, UWB, ZigBee, or other forms of communication. The communication connection between the first mobile terminal 400 and the second mobile terminal 500 may be requested by either the first mobile terminal 400 or the second mobile terminal 500, and the communication connection can be performed between the terminals based on a normal response to the request.

After communication is connected, transmitted data is received from a terminal that is connected for communication (S210). In particular, the first controller 408 receives data corresponding to screen images (e.g., UIs or GUIs, image data, or voice data) according to the results obtained by executing a certain function transmitted from the second mobile terminal 500 and/or video codec setting information (e.g., codec setting information related to a screen setting or audio codec setting information) of the second mobile terminal 500 via the first communication unit 409.

Thereafter, the received data is processed into a certain signal (S220). In particular, the first controller 408 processes the received data (e.g., decoding and/or scaling) based on the received video codec setting information of the second mobile terminal 500 and the video codec setting information of the first mobile terminal 400 stored in the first storage unit 405. For example, the first controller 408 decodes data with respect to the GUI screen image included in the received data, and scales the decoded data with respect to the GUI screen image to have a particular resolution based on the codec information previously set in the first mobile terminal 400.

Here, the scaling of the decoded data with respect to the GUI screen image is scaling down or scaling up the decoded data with respect to the GUI screen image to have a data size (width x length) or a certain resolution with respect to a certain GUI screen image. Namely, when the resolution of the received data is different from resolution previously set in the first mobile terminal 400, the first controller 408 may scale the resolution of the received data to the resolution previously set in the first mobile terminal 400. When the resolution of the received data is the same as the resolution previously set in the first mobile terminal 400, the first controller 408 may provide control to use the resolution of the received data as it is in the first mobile terminal 400. Also, the first controller 408 decodes voice data included in the received data.

Figure 9A:
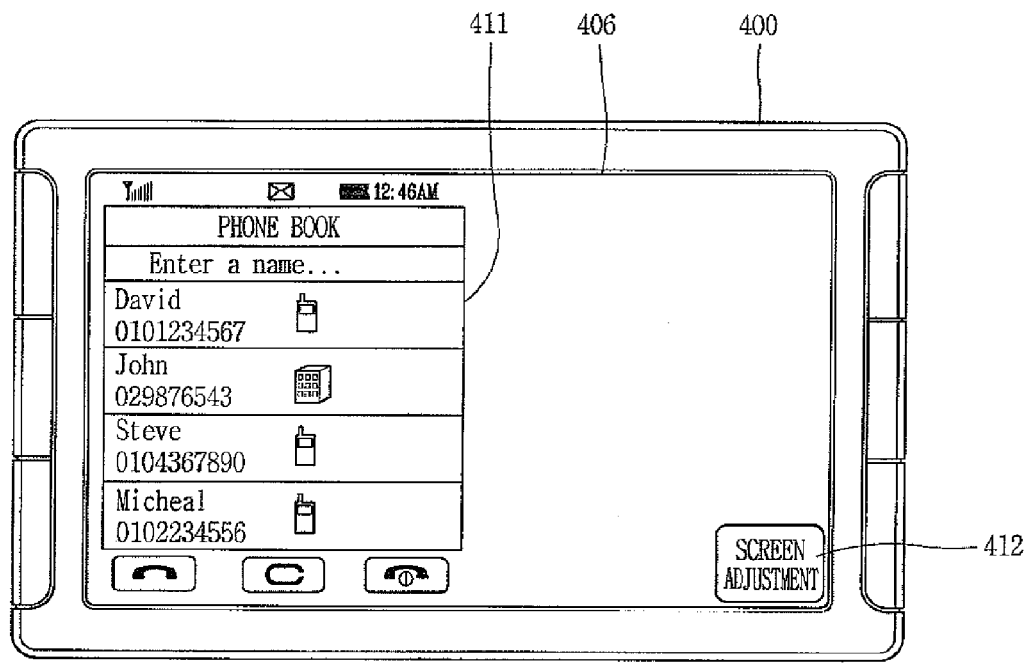
FIGS. 9A and 9B are overviews of display screens of mobile terminals generated with the second process.

Thereafter, processed data is then output (S230). In particular, the first controller 408 outputs the processed data to the first display unit 406 and/or to the first voice output unit 407. For example, as shown in FIG. 9A, the first controller 408 displays the processed GUI screen image 411 on the first display unit 406. In this case, content of the GUI screen image 411 illustrated in FIG. 9A is the same as that of the phone book screen image 511 displayed on the second display unit 503 (that is, the content of the phone book illustrated in FIG. 9A and that of the phone book illustrated in FIG. 7A are the same, and the screen size may be equal, smaller or larger) of the second mobile terminal 500.

Also, when a certain button (not shown) provided at one side of the first mobile terminal 400 is clicked or a 'screen adjustment' button displayed on a portion of the first display unit 406 is clicked, the first controller 408 re-scales the data displayed on the first display unit 406 (e.g., rotates the currently displayed screen image by 90 degrees or 180 degrees right and left) and displays the re-scaled data on the first display unit 406.

Figure 9B:
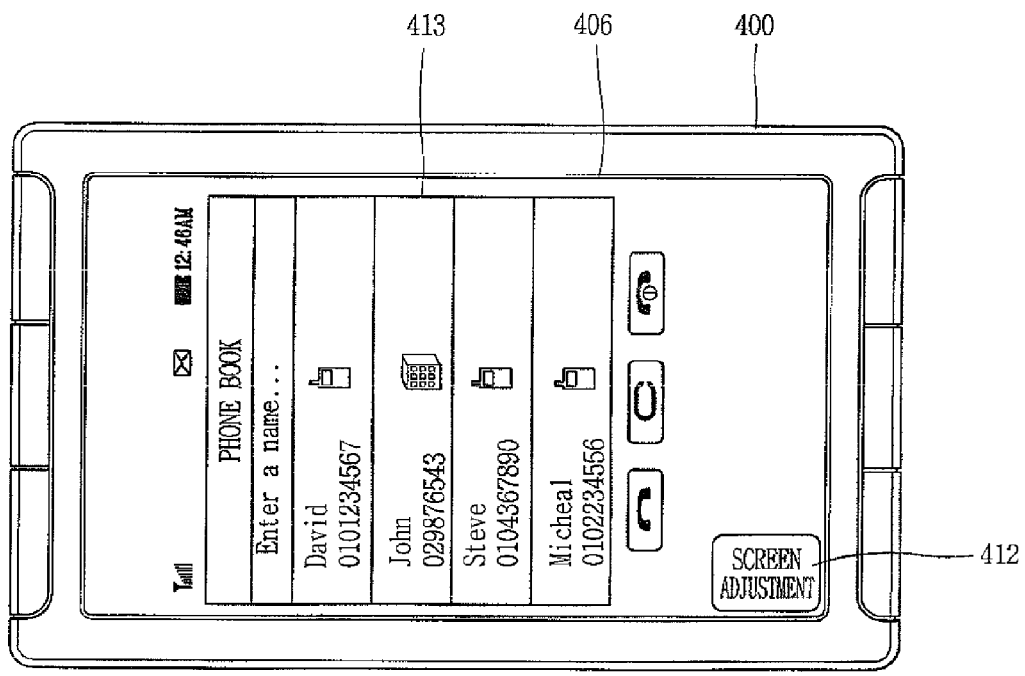

For example, as shown in FIG. 9B, when the first GUI screen image 413 scaled by the first controller 408 is displayed and the screen adjustment button 412 is clicked according to a user input, the first controller 408 may re-scale the first GUI screen image 413 to have one of a plurality of pre-set resolutions to generate the second GUI screen image 411 and display the generated second GUI screen image 411 as shown in FIG. 9A on the first display unit 406. Namely, when the screen adjustment button provided on the first mobile terminal 400 is selected, the first controller 408 may change the resolution of the data displayed on the first display unit 406 and/or the data position (e.g., movement or rotation) according to a certain method or according to one of a plurality of pre-set methods.

Thereafter, the inputted function information is transmitted (S240). In particular, the first controller 408 transmits information regarding a function (menu or coordinates) selected by the user from among the data displayed on the first display unit 406 to the second mobile terminal 500 via the first communication unit 409. Next, results of performing the function are received and output (S250). In particular, the first controller 408 receives the results obtained by executing the corresponding function transmitted from the second mobile terminal via the first communication unit 409, processes (e.g., decoding and/or scaling) the received function execution results, and outputs the same to the first display unit 406 and/or to the first voice output unit 407.

Figure 10:
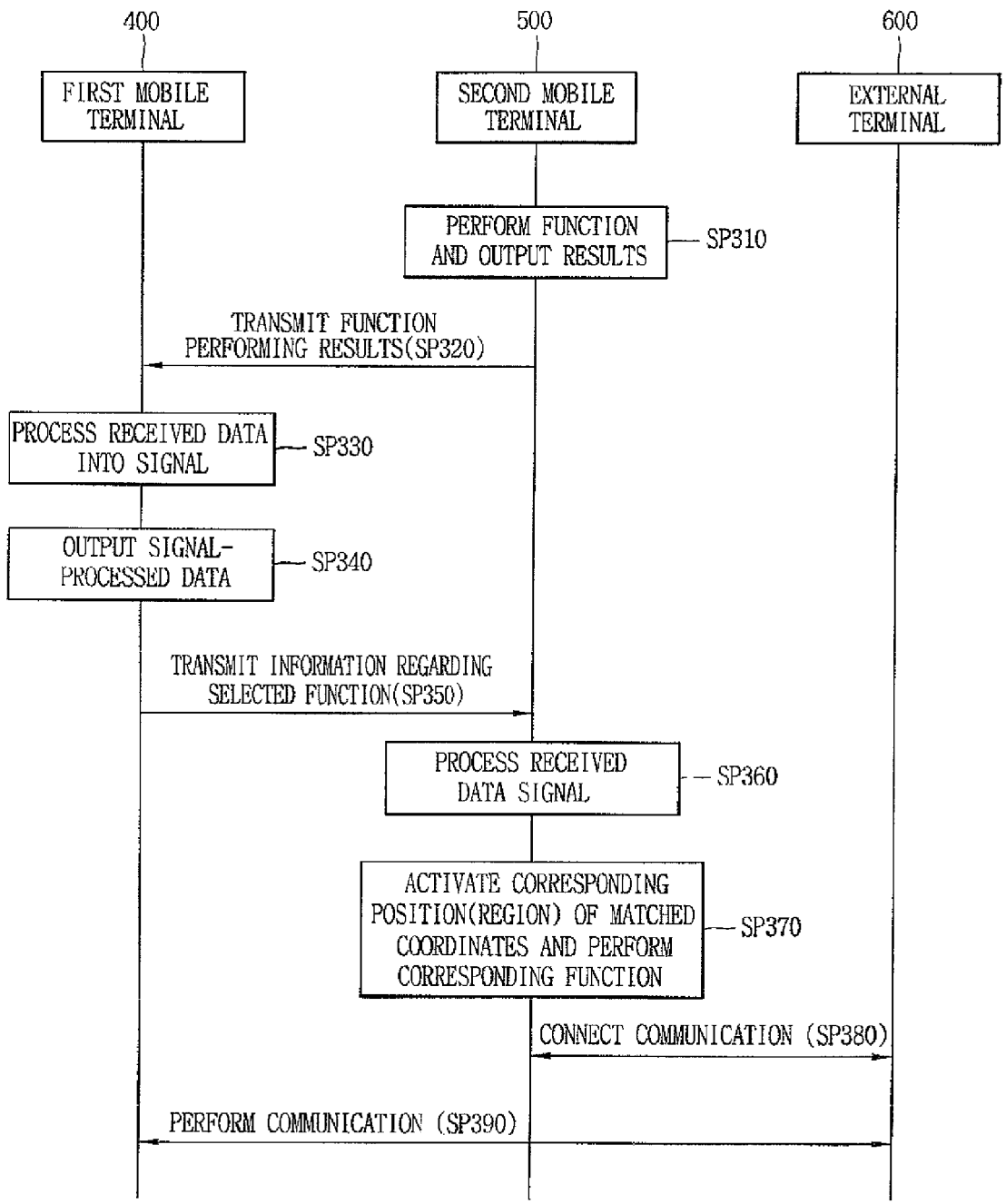
FIG. 10 is a flow chart of a third process for communication with a mobile terminal system.
Figure 11A:
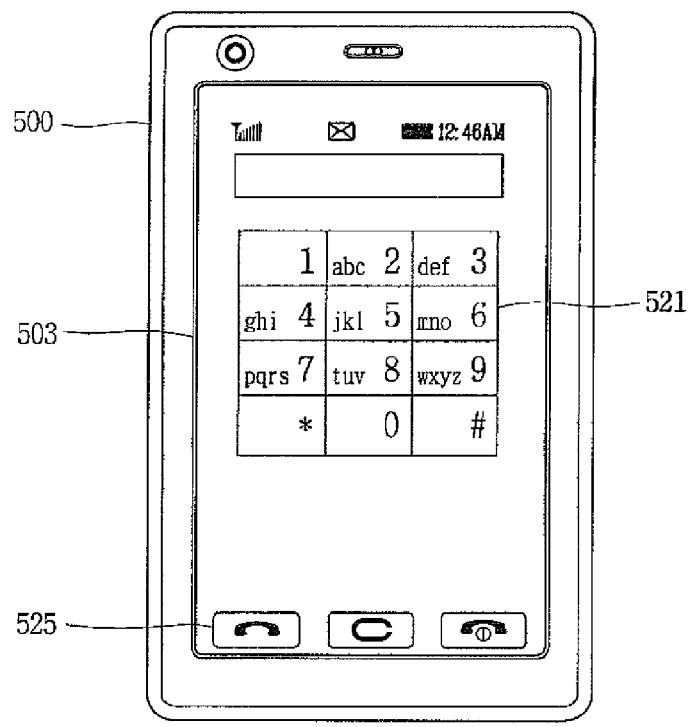
FIGS. 11A to 11D are overviews of display screens of mobile terminals generated with the third process.

FIG. 10 is a flow chart of a third process for communication with a mobile terminal system. First, a function is performed and the results are output (SP310). In particular, the second controller 505 executes a certain function (or a certain application program) stored in the second storage unit 502 of the second mobile terminal 500, and provides control to output the function execution results (or data according to the function execution results) to the second display unit 503 and/or to the second voice output unit 504. In this case, the data according to the function execution results may include screen images (e.g., various menu screen images) such as UIs or GUIs, and the like, stored in the second storage unit 502. For example, as shown in FIG. 11A, the second controller 505 displays a dial screen image 521 stored in the second storage unit 502 on the second display unit 503.

Thereafter, the results of performing the function are transmitted (SP320). In particular, the second controller 505 transmits data according to the function execution results outputted via the second display unit 503 and/or via the second voice output unit 504 to the connected first mobile terminal 400 via wireline or wireless communication. In this case, the wireline or wireless communication method may be a VNC, a USB, Wi-Fi, Bluetooth™, RFID, infrared communication, UWB, ZigBee, or other forms of communication.

The communication connection between the first mobile terminal 400 and the second mobile terminal 500 may be requested by either the first mobile terminal 400 or the second mobile terminal 500, and the communication connection can be performed between the terminals based on a normal response to the request. The first mobile terminal 400 and the second mobile terminal 500 can be connected using Bluetooth™, a headset profile, or an advanced audio distribution profile (A2DP). Also, when transmitting the data according to the function execution results, the second controller 505 may also transmit video codec setting information (e.g., codec setting information related to a screen setting, or audio codec setting information) of the second mobile terminal 500 to the first mobile terminal 400.

The first controller 408 receives data corresponding to screen images, such as UIs or GUIs according to the results obtained by executing a certain function transmitted from the second mobile terminal 500 and/or video codec setting information (e.g., codec setting information related to a screen setting or audio codec setting information) of the second mobile terminal 500 via the first communication unit 409. Thereafter, the received data is processed into a signal (SP330). In particular, the first controller 408 processes the received data (e.g., decoding and/or scaling) based on the received video codec setting information of the second mobile terminal 500 and the video codec setting information of the first mobile terminal 400 stored in the first storage unit 405.

For example, the first controller 408 decodes data with respect to the dial screen image (the GUI screen image) included in the received data, and scales the decoded data with respect to the dial screen image to have a particular resolution based on the codec information previously set in the first mobile terminal 400. Namely, when the resolution of the received data is different from resolution previously set in the first mobile terminal 400, the first controller 408 may scale the resolution of the received data to the resolution previously set in the first mobile terminal 400. When the resolution of the received data is the same as the resolution previously set in the first mobile terminal 400, the first controller 408 may provide control to use the resolution of the received data as it is in the first mobile terminal 400. Also, the first controller 408 decodes voice data included in the received data.

Figure 11B:
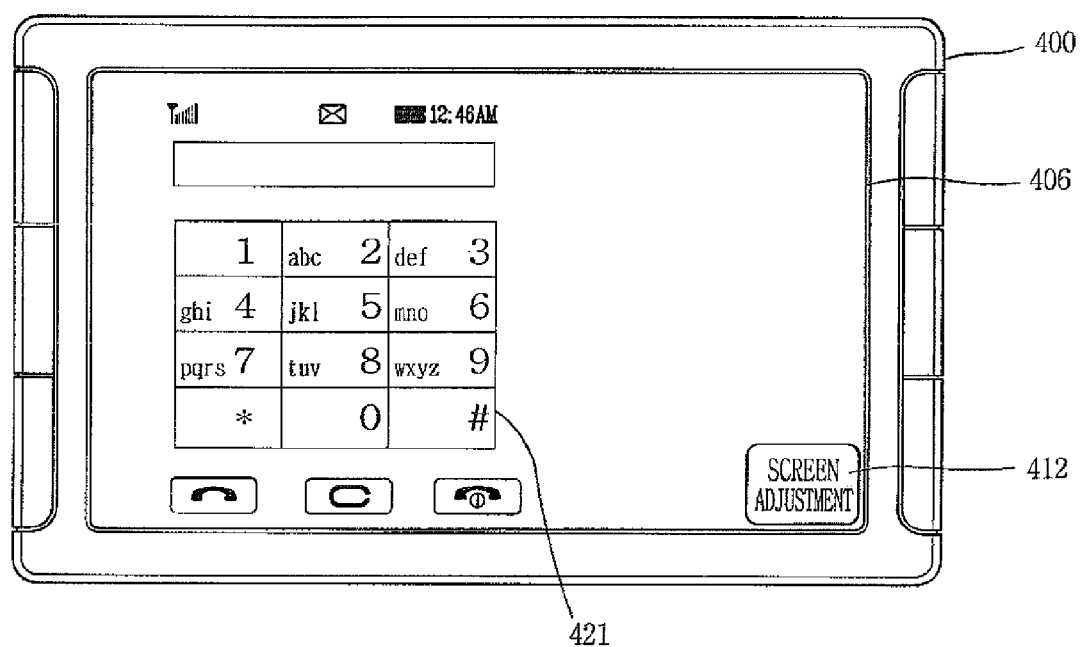

Thereafter, the received data of the processed signal is output (SP340). In particular, the first controller 408 outputs the processed data to the first display unit 406 and/or to the first voice output unit 407. For example, as shown in FIG. 11A, the first controller 408 displays the processed dial screen image 421 corresponding to the GUI screen image on the first display unit 406. In this case, the content displayed on the first display unit 406 is the same as that of the content displayed on the second display unit 503 (that is, the content including the dial screen image 421 as shown in FIG. 11B and the content including the dial screen image 521 as shown in FIG. 11A are the same, and the screen size may be equal, smaller or larger) of the second mobile terminal 500. Also, when a certain button (not shown) provided at one side of the first mobile terminal 400 is clicked or a 'screen adjustment' button displayed on a portion of the first display unit 406 is clicked, the first controller 408 re-scales the data displayed on the first display unit 406 (e.g., rotates the currently displayed screen image by 90 degrees or 180 degrees right and left) and displays the re-scaled data on the first display unit 406.

Figure 11C:
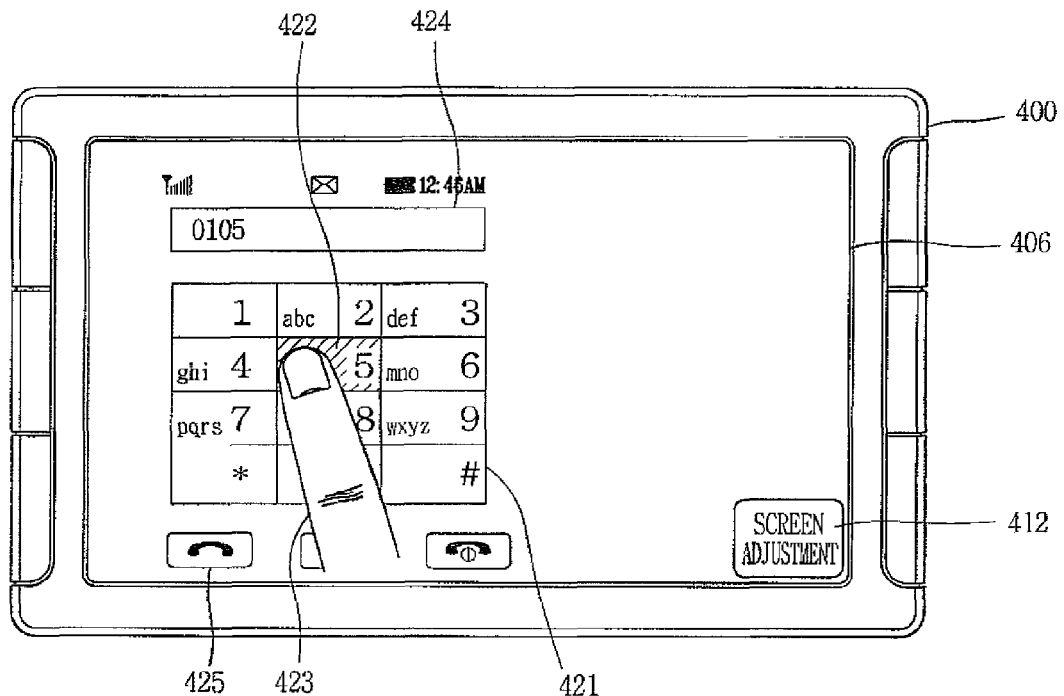

Thereafter, information regarding the selected function is transmitted (SP350). In particular, the first controller 408 transmits information regarding a function (or menu or coordinates) selected by the user from the data displayed on the first display unit 406 to the second mobile terminal 500 via the first communication unit 409. For example, as shown in FIG. 11C, when a particular button is clicked by the user on the dial screen image 421 displayed on the first display unit 406, the first controller 408 displays a number corresponding to the clicked particular button at a region 422 of the first display unit 406 and transmits information (coordinate information or control information corresponding to the number) regarding the number corresponding to the clicked particular button to the second mobile terminal 500 via the first communication unit 409. Also, when transmitting the information regarding the selected function, the first controller 408 may also transmit video codec setting information (e.g., codec setting information related to a screen setting, or audio codec setting information) of the first mobile terminal 400 to the second mobile terminal 500.

Thereafter, the received data signal is processed (SP360). In particular, the second controller 505 receives data transmitted from the first mobile terminal 400 and processes (e.g., decoding and/or scaling) the received data. In this case, the data transmitted from the first mobile terminal 400 may include coordinate information regarding the function selected correspondingly according to the UI or GUI screen image, coordinate information regarding the selected function according to the menu screen image, control information corresponding to the selected function, various control signals, or other information. Also, if the data transmitted from the connected first mobile terminal 400 includes information regarding a number corresponding to a particular button, the second controller 505 processes the received data and matches the number information included in the processed data to the coordinates of the data displayed on the second display unit 503.

Thereafter, the corresponding position or region of matched coordinates is activated and a corresponding function is performed (SP370). In particular, the second controller 505 provides control to activate a location (or region) corresponding to the matched coordinates in the data displayed on the second display unit 503. Also, the second controller 505 may provide control to display an emoticon in a mouse shape or a finger shape stored in the second storage unit 502 at a location (region) corresponding to the matched coordinates.

Figure 11D:
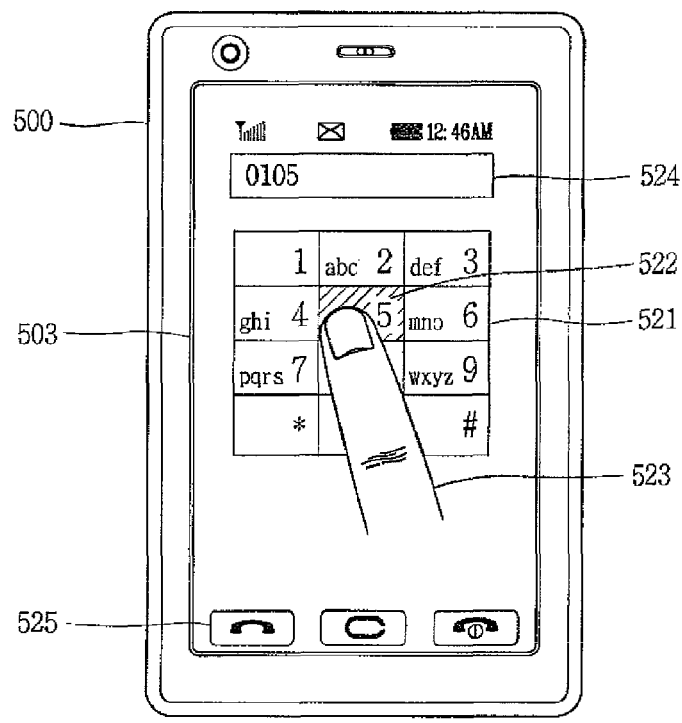

For example, as shown in FIG. 11D, if information regarding the number included in the data transmitted from the first mobile terminal 400 is 5, the second controller 505 may provide control to activate the region of number 5 (522) and/or display a finger shape on the region of number 5 (523) in order to indicate that the region of number 5 has been selected. Also, the second controller 505 executes a pre-set function correspondingly according to the activated location (region). Namely, the second controller 505 may provide control to continuously (accumulatively) display the information, like '0105', regarding the corresponding numbers included in the data transmitted from the first mobile terminal 400 on an input window 524. In addition, as well as displaying the information regarding the numbers continuously transmitted from the first mobile terminal 400 on the input window 524 of the second display unit 503, the second controller 505 also accumulatively stores the information regarding the transmitted numbers on the second storage unit 502).

Thereafter, a communication connection is established (SP380). In particular, if a function corresponding to the activated location is 'call connection' function, the second controller 505 performs communication connection with the external terminal 600 having the continuously received numbers. Namely, as shown in FIG. 11D, when the function included in the received data is the 'call connection' function 525, the second controller unit 506 performs communication connection with the external terminal 600 corresponding to the number information (corresponding to a certain phone number) accumulatively stored in the second storage unit 502.

Finally, the communication is performed (SP390). In particular, the second controller 505 outputs the results of the communication connection with the external terminal 600 to the second display unit 503 and/or to the second voice output unit 504 and, approximately concurrently, transmits the results according to the function execution to the first mobile terminal 400 via the second communication unit 506.

Through the above-described processes, the first mobile terminal 400 can perform communication connection with the external terminal 600 by the medium of the second mobile terminal 500. In this manner, the first mobile terminal 400 can perform a communication connection with the external terminal 600 having the certain phone number using the dial screen image provided from the second mobile terminal 500. Also, when the first mobile terminal 400 is connected with the second mobile terminal 500 according to a short-range communication method and the second mobile terminal 500 is connected with the external terminal 600 or the Internet service providing server (not shown) via wireline or wireless communication, the first mobile terminal 400, although it has a short-range communication module, can transmit or receive data to and from the external terminal 600 or the Internet service providing server at a remote area via the second mobile terminal 500.

In this manner, the first mobile terminal 400 can use various functions (e.g., functions included in the second mobile terminal 500 such as Web surfing through wireline or wireless Internet accessing, the use of a mail service, game programs, a plurality of application programs, or other functions) which are provided by the second mobile terminal 500 but not provided by the first mobile terminal 400. Also, when communication connection is made between the first mobile terminal 400 and the second mobile terminal 500, an authentication procedure may be performed between the terminals using, for example, a terminal-specific ID, a phone number, or IP information.

Figure 12:
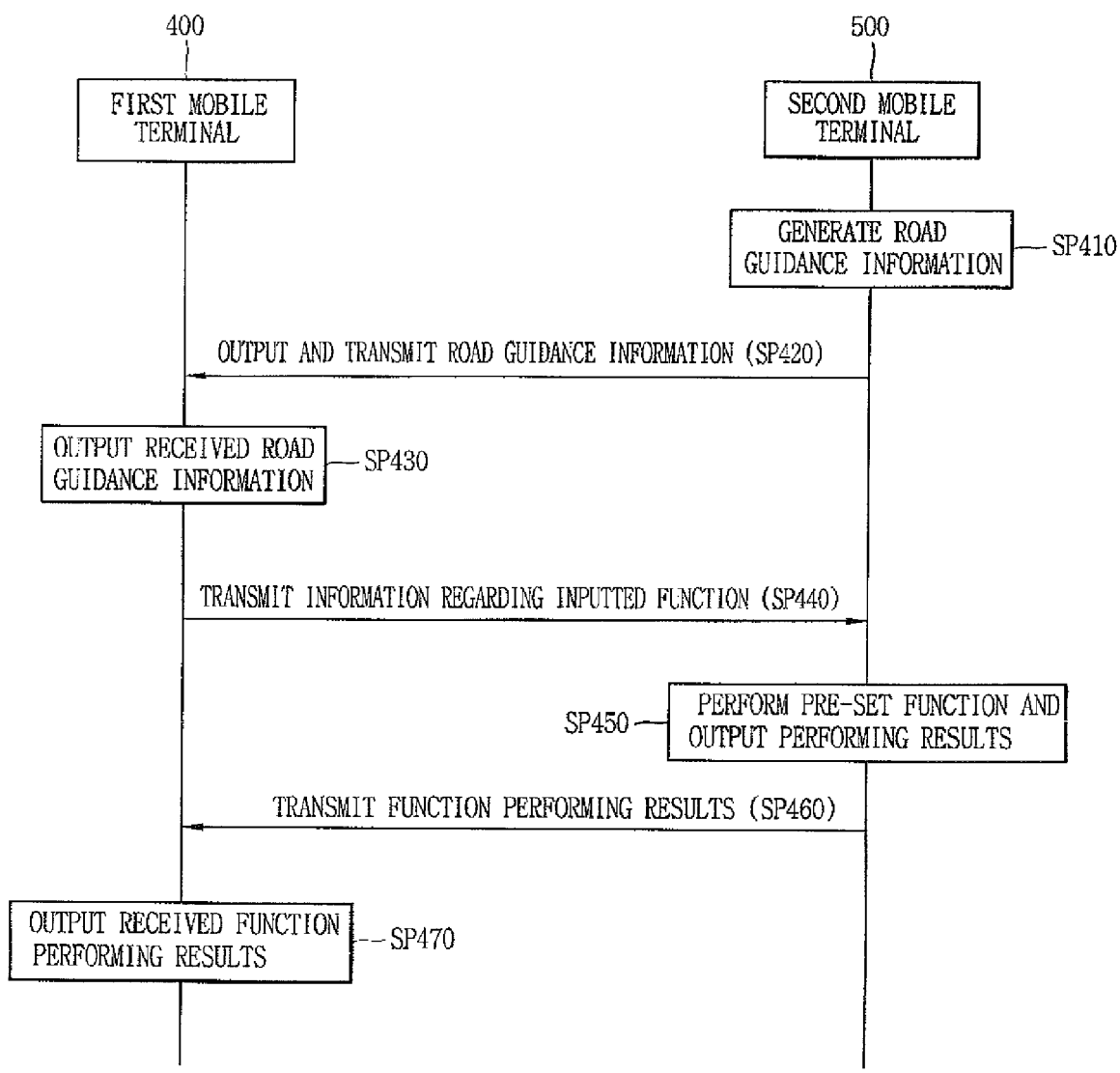
FIG. 12 is a flow chart of a fourth process for communication with a mobile terminal system.

FIG. 12 is a flow chart of a fourth process for communication with a mobile terminal system. In the process, road guidance information is generated (SP410). In particular, the second controller 505 generates location data based on a signal received by a GPS receiver (not shown), and generates a current estimated location based on the generated location data. Thereafter, the second controller 505 reads map data corresponding to a traveling route from the second storage unit 502. In this case, the location-based technique largely uses GPS information (e.g., a signal received by the GPS receiver) but may also use a hybrid positioning system using both cell tower signal triangulation and Wi-Fi positioning information in addition to the GPS information. Here, location data may be generated based on the signal received by the GPS receiver 401 provided in the connected first mobile terminal 400, and the first mobile terminal 400 may transmit the generated location data to the second mobile terminal 500. Also, the second mobile terminal 500 may be configured to receive the transmitted location data and generate a current estimated location based on the received location data.

The second controller 505 matches the estimated location to a link (road) included in the map data. For example, the second controller 505 generates the estimated location based on the location data, matches the generated estimated location to links in the map data stored in the first storage unit 502 according to the link order, and outputs the matched map information (i.e., the map matching results). In this case, the matched map information (map matching results) is information which has been generated with reference to pre-set user information, a road state using TPEG information, and a current state information of a vehicle (e.g., an oil state, a state of air pressure of tire, or other vehicle state) when the second mobile terminal 500 is provided in the vehicle. Thereafter, the second controller 505 generates road guidance information based on the matched map information. The generated road guidance information may include one or more of map data, POI information, lane information, running limit speed information, and turn-by-turn list information.

Thereafter, the generated road guidance information is output and transmitted (SP420). In particular, the second controller 505 outputs the generated road guidance information to the second display unit 503 and/or to the second voice output unit 504. Here, the second display unit 503 and the second voice output unit 504 may be configured as a single unit, such as, an output unit (not shown). Also, the second controller 505 transmits the generated road guidance information to the first mobile terminal 400 via the second communication unit 506 approximately concurrently with the second controller's 505 outputting of the generated road guidance information to the second display unit 503 and/or to the second voice output unit 504. The road guidance information may be compressed.

Thereafter, the received road guidance information is output (SP430). In particular, the first controller 408 processes (e.g., decoding and/or scaling) the received road guidance information and then outputs the processed road guidance information to the first display unit 406 and/or to the first voice output unit 407. Also, the first controller 408 may display the 'screen adjustment' button on a portion of the first display unit 406. When the 'screen adjustment' button is selected, the first controller may change the resolution of the currently displayed screen image to a certain resolution (one of a plurality of pre-set resolutions) or may provide control to move or rotate the currently displayed screen image in a horizontal direction.

Next, information regarding an inputted function is transmitted (SP440). In particular, the first controller 408 transmits information regarding a function selected according to a user input (i.e., control information regarding a function of a selected button/POI) among the road guidance information displayed on the first display unit 406 to the second mobile terminal 500. Here, the information regarding the function selected according to the user input may include information regarding a certain menu or POI included in the road guidance information displayed on the first display unit 406, destination information (with or without a start point), information regarding enlargement, reduction, or movement of map data, or particular POI selection information.

Thereafter, a pre-set function is performed and results of the performed pre-set function are outputted (SP450). In particular, the second controller 505 processes the information regarding the received corresponding function and executes the pre-set function corresponding to the processed information. Namely, if the function included in the received information is a magnification, reduction, or movement function, the second controller 505 executes the magnification, reduction, or movement function with respect to the road guidance information (e.g., map data) displayed on the second display unit 503. Also, if the received information includes destination information, the second controller 505 performs route searching based on the destination information. In this case, the route searching may be performed using various supplementary information (e.g., TPEG information) collected by the second mobile terminal 500 or using various supplementary information transmitted from the first mobile terminal 400.

Also, if the received information includes information selecting a particular POI, the second controller 505 extracts detailed information regarding the selected particular POI from the second storage unit 502. The second controller 505 outputs pre-set function execution results corresponding to the processed information to the second display unit 503 and/or to the second voice output unit 504. For example, if the map data displayed on the second display unit 503 is magnified by a pre-set value based on the magnification function of the map data included in the received information, the second controller 505 displays the magnified map data on the second display unit 503.

For another example, if route searching is performed based on the received destination information, the second controller 505 may display the route search results or road guidance information generated according to the route search results on the second display unit 503. For still another example, if detailed information regarding the particular POI is extracted from the second storage unit 502 based on the received particular POI selection information, the second controller 505 displays detailed information regarding the extracted particular POI on the second display unit 503.

Next, results of performing the function are transmitted (SP460). In particular, the second controller 505 transmits pre-set function execution results according to the signal processed information to the first mobile terminal 400. For example, when map data is magnified, the second controller 505 transmits magnified map data displayed on the second display unit 503 to the first mobile terminal 400. For another example, when route searching is performed based on destination information, the second controller 505 transmits generated road guidance information according to the route search results displayed on the second display unit 503 to the first mobile terminal 400. For still another example, when the detailed information corresponding to the particular POI is extracted based on the particular POI selection information, the second controller 505 transmits the detailed information of the particular POI displayed on the second display unit 503 to the first mobile terminal 400.

Thereafter, received results of performing the function are output (SP470). In particular, the first controller 408 processes the received function execution results and outputs the processed data to the first display unit 406 and/or to the first voice output unit 407. For example, if the received data is magnified map data, the first controller 408 processes the received magnified map data and displays the processed magnified map data on the first display unit 406. For another example, if the received data is road guidance information generated according to route search results, the first controller 408 processes the road guidance information according to the received route search results and displays the road guidance information generated according to the processed route search results on the first display unit 406. Also, if the received data is detailed information regarding a particular POI, the first controller 408 processes the received detailed information regarding the particular POI and displays the processed detailed information regarding the particular POI on the first display unit 406.

In addition, the first mobile terminal 400 may be connected with the information providing center 700 via the second mobile terminal 500 to receive various information (e.g., the road guidance information, the detailed information regarding the particular POI, cost information of a gas station, or TPEG information) transmitted from the information providing center 700, and may output the received various information to the first display unit 406 and/or to the first voice output unit 407. If the second mobile terminal 500 is provided at a region of a front seat within the vehicle and the first mobile terminal 400 is provided at a region of a back seat within the vehicle to form a rear seat entertainment (RSE) system, the first mobile terminal 400 can display various information provided from the second mobile terminal 500 and, approximately concurrently, control a function provided from the second mobile terminal 500.

Figure 13:
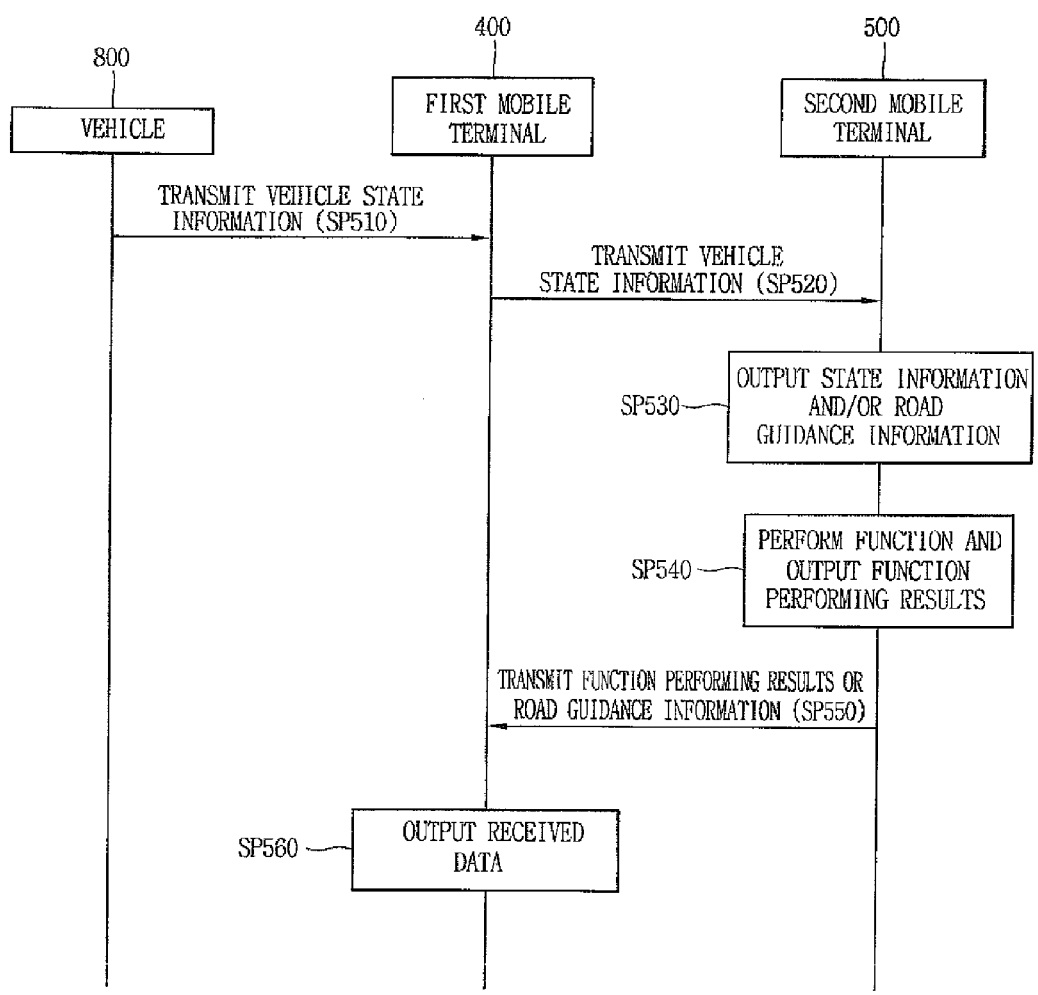
FIG. 13 is a flow chart of a fifth process for communication with a mobile terminal system.

FIG. 13 is a flow chart of a fifth process for communication with a mobile terminal system. Initially, vehicle state information is transmitted (SP510). In particular, a vehicle 800 transmits vehicle state information detected by a detection unit (not shown) provided in the vehicle 800 to the first mobile terminal 400 connected for communication. In this case, the vehicle 800 may be connected for communication with the first mobile terminal 400 via wireline or wireless communication, such as a VNC, a USB, Wi-Fi, Bluetooth™, RFID, infrared communication, UWB, ZigBee, or other communication.

If the vehicle 800 is a general vehicle, such as an internal combustion vehicle (ICV), the state information of the vehicle 800 can include a fuel level, an engine status, speed information, an air pressure of tire, start ON/OFF information, door ON/OFF information, or other information. If the vehicle 800 is an electric vehicle (EV) such as a pure EV or a hybrid EV (HEV), the state information of the vehicle 800 may include similar or further information, including a state of charge (SOC), an engine state, speed information, an air pressure of tire, start ON/OFF information, door ON/OFF information, or other information.

Thereafter, the transmitted vehicle state information is further transmitted (SP520). In particular, the first mobile terminal 400 transmits the vehicle state information transferred from the vehicle 800 to the connected second mobile terminal 500 according to the wireline or wireless communication. In this case, the wireline or wireless communication may be a VNC, a USB, Wi-Fi, Bluetooth™, RFID, infrared communication, UWB, ZigBee, or other communication. The communication connection between the first mobile terminal 400 and the second mobile terminal 500 may be requested by either the first mobile terminal 400 or the second mobile terminal 500, and the communication connection can be performed between the terminals based on a normal response to the request.

Also, when the communication connection is made between the first mobile terminal 400 and the second mobile terminal 500, an authentication procedure (e.g., using a terminal-specific ID, a phone number, or IP information) may be performed between the terminals. After the first controller 408 processes the vehicle state information transferred from the vehicle 800, it may output the processed vehicle state information to the first display unit 406 and/or to the first voice output unit 407. In addition, the first mobile terminal 400 transmits location data of the first mobile terminal (or the vehicle) to the second mobile terminal 500.

Next, state information or road guidance information is output (SP530). In particular, the second controller 505 processes the vehicle state information transmitted from the first mobile terminal 400 and outputs the processed vehicle state information to the second display unit 503 and/or to the second voice output unit 504. The second controller 505 matches the received location data of the first mobile terminal (or the vehicle) to a link (road) included in the map data stored in the second storage unit 502 and outputs the matched map information (map matching results). In this case, the mapped map information (map matching results) is information generated by referring to pre-set user information, a road state using TPEG information or the like, vehicle state information (e.g., a fuel level, air pressure of tire, or a SOC).

Then, the second controller 505 generates road guidance information based on the matched map information. The generated road guidance information may include one or more of map data, POI information, lane information, running limit speed information, or turn-by-turn list information. The second controller 505 may output the generated road guidance information along with the vehicle state information to the second display unit 503 and/or to the second voice output unit 504. Also, the second controller 505 may generate location information of the second mobile terminal 500 using the location data based on a signal received by a GPS receiver (not shown) provided in the second mobile terminal 500, and output the generated location information of the second mobile terminal 500 along with the generated road guidance information. Namely, the generated road guidance information may include location information of the first mobile terminal 400 and that of the second mobile terminal 500.

Thereafter, a function is performed and the results of performing the function are output (SP540). In particular, the second controller 505 may execute a pre-set function based on the vehicle state information. For example, if the fuel level (or the SOC) included in the received vehicle state information is lower than a pre-set first threshold value, the second controller 505 may search for a gas station (e.g., a gas station that offers the lowest price or a gas station which is most adjacent to the location of the first mobile terminal) corresponding to pre-set conditions among a plurality of gas stations based on the current location of the first mobile terminal 400 and information regarding the plurality of gas stations (or charging stations) stored in the storage unit 502. In this case, in searching for gas stations, the second controller 505 may search for gas stations in consideration of a pre-set user preference (e.g., a brand of a gas station preferred by the user or a gas station that offers a discount coupon).

In addition, the information regarding the plurality of gas stations may be provided from the information providing center 700 or an Internet service providing server (not shown) connected with the second mobile terminal 500. For another example, if the engine state included in the received vehicle state information is lower than a pre-set second threshold value or different than a predetermined acceptable state, the second controller 505 may search for a service center (i.e., the garage) most adjacent to the location of the first mobile terminal (or the vehicle) among a plurality of service stations based on the current location of the first mobile terminal 400 and information regarding the plurality of service centers stored in the storage unit 502. In this case, in searching for the service centers, the second controller 505 may search for gas stations in consideration of a pre-set user preference (e.g., a brand of a service center preferred by the user or a service center that offers a discount coupon). In addition, the information regarding the plurality of service centers may be provided from the information providing center 700 or an Internet service providing server (not shown) connected with the second mobile terminal 500.

Also, the second controller 505 outputs the pre-set function execution results corresponding to the vehicle state information to the second display unit 503 and/or to the second voice output unit 504. For example, if the fuel level (or the SOC) included in the received vehicle state information is lower than the pre-set threshold value, the second controller 505 outputs search results with respect to the gas station (or charging station) which is most adjacent to the first mobile terminal (or the vehicle) and offers the lowest price) to the second display unit 503 and/or to the second voice output unit 504. For another example, if the engine state included in the received vehicle state information is lower than the pre-set second threshold value or different than the predetermined acceptable state, the second controller 505 outputs search results with respect to the service center which is most adjacent to the first mobile terminal (or the vehicle) to the second display unit 503 and/or to the second voice output unit 504.

Thereafter, results of performing the function or road guidance information is transmitted (SP550). In particular, the second controller 505 transmits the pre-set function execution results corresponding to the generated road guidance information or the received vehicle state information to the first mobile terminal 400. For example, if the fuel level (or the SOC) included in the received vehicle state information is lower than the pre-set threshold value, the second controller 505 outputs search results with respect to the gas station (or charging station) which is most adjacent to the first mobile terminal (or the vehicle) and offers the lowest price) to the first mobile terminal 400. For another example, if the engine state included in the received vehicle state information is lower than the pre-set second threshold value or different than the predetermined acceptable state, the second controller 505 outputs search results with respect to the service center which is most adjacent to the first mobile terminal (or the vehicle) to the first mobile terminal 400.

Also, when the second controller 505 transmits the pre-set function execution results corresponding to the generated road guidance information or the received vehicle state information to the first mobile terminal 400, if speed information included in the received vehicle state information exceeds a pre-set third threshold value, the second controller 505 may interrupt transmission of defined information to interfere with the user's driving operation, using, for example, rendering of media pertaining to the violation of speed limits.

For example, when the second controller 505 transmits road guidance information and advertisement information to the first mobile terminal 400, if speed information included in the received vehicle state information is 70 miles per hour and is exceeding a pre-set threshold value previously set as 60 miles per hour, the second controller 505 may provide control to transmit only road guidance information, among information desired to be transmitted (e.g., the road guidance information and advertisement information), while excluding the advertisement information, to the first mobile terminal 400. Also, if the speed information included in the received vehicle state information exceeds a further pre-set threshold value, the second controller 505 generates a first control signal for limiting (or deactivating) some of the functions of the first mobile terminal 400 and transmit the generated first control signal to the first mobile terminal 400. For example, if the speed information included in the received vehicle state information is 95 miles per hour and is exceeding a further pre-set threshold value of 90 miles per hour, the second controller 505 generates a first control signal for deactivating (or limiting) an input function (e.g., a touch input) of the first mobile terminal 400 and transmits the generated first control signal to the first mobile terminal 400.

In this manner, the mobile terminal system can be used to limit functionality when a user is excessively speeding. For example, by speeding to a lesser degree (i.e., above the threshold), functionality may be somewhat limited, while speeding to a further degree (i.e., above the threshold and the further threshold), functionality may be more strictly limited.

Thereafter, the received data is output (SP560). In particular, the first controller 408 processes (e.g., decoding and/or scaling) the received function execution results or the road guidance information and outputs the processed data to the first display unit 406 and/or to the first voice output unit 407. For example, if the received data includes information regarding a gas station (or charging station), the first controller 408 processes information regarding the gas station and displays the processed information regarding the gas station on the first display unit 406. In this case, the first controller 408 may also display the information regarding the fuel level (or the SOC) included in the vehicle state information transferred from the vehicle 800 and the location information of the first mobile terminal (or the vehicle).

For another example, if the received data includes information regarding a service center and road guidance information (including the location information of the first mobile terminal), the first controller 408 processes the received information regarding the service center and the road guidance information and displays the processed information regarding the service center and the road guidance information on the first display unit 406. In this case, the first controller 408 may also display information regarding the engine state included in the vehicle state information transferred from the vehicle 800 together. Also, the first controller 408 provides control to limit some of the functions of the first mobile terminal 400 based on the received first control signal. For example, the first controller 408 may deactivate the input function (e.g., a touch input, etc.) of the first input unit or the first display unit 406 included in the first mobile terminal 400 based on the received first control signal.

In this manner, the first mobile terminal 400 may transmit the vehicle state information, which has been transferred from the vehicle, to the second mobile terminal 500, receive the function execution results corresponding to the vehicle state information transferred from the second mobile terminal 500, and output the received function execution results. Also, the second mobile terminal 500 may perform a pre-set function based on the vehicle state information transferred via the first mobile terminal 400, and implement an application function such as a location-based service. Also, the second mobile terminal 500 may implement an integrated system by performing a pre-set function based on the vehicle state information transferred via the first mobile terminal 400 and information transferred from the Internet-accessible information providing center 700 or the Internet service providing server (not shown).

Figure 14:
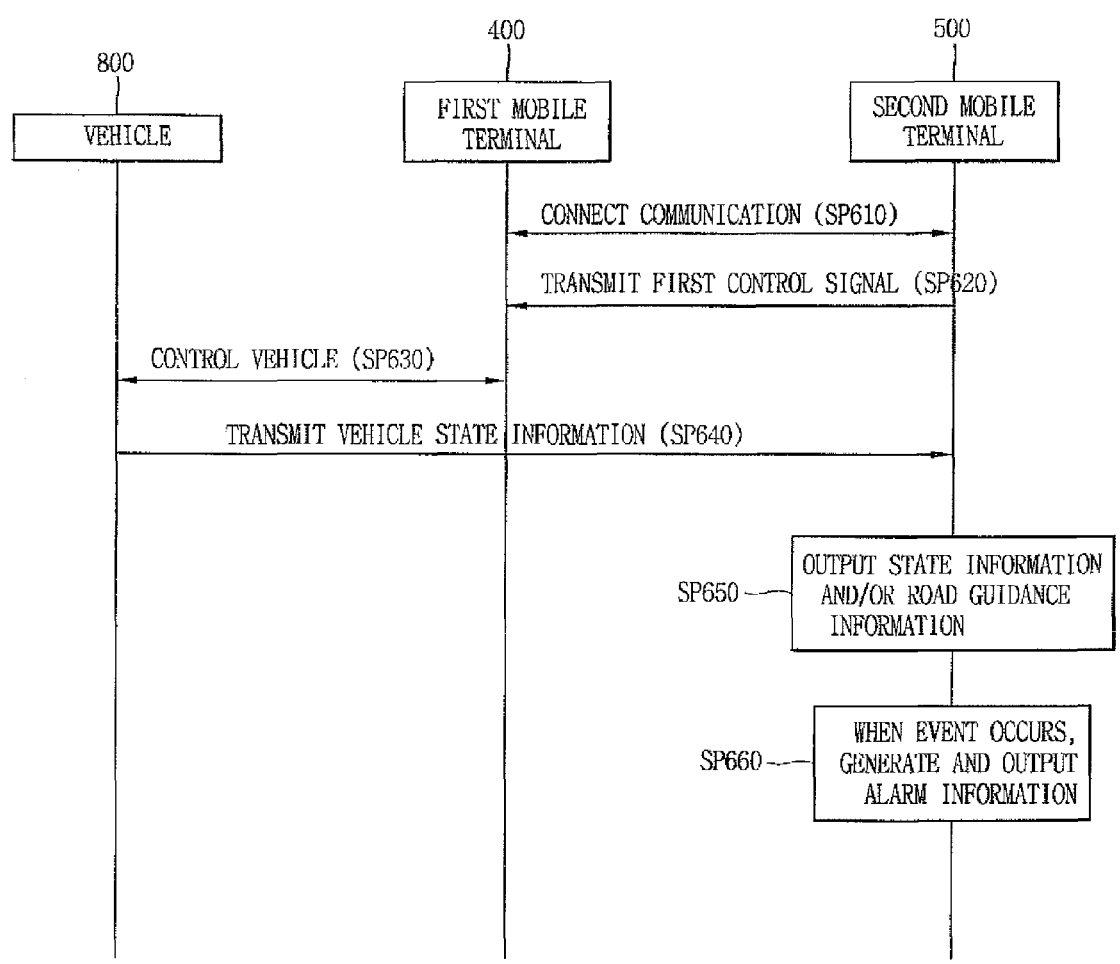
FIG. 14 is a flow chart of a sixth process for communication with a mobile terminal system.

FIG. 14 is a flow chart of a sixth process for communication with a mobile terminal system. In the process, a communication is established (SP610). In particular, the first controller 408 performs a communication connection with the second mobile terminal 500 via the first communication unit 409. In this case, the first communication unit 409 may be connected for communication with the second mobile terminal 500 via wireline or wireless method, such as a VNC, a USB, Wi-Fi, Bluetooth™, RFID, infrared communication, UWB, ZigBee, or other communication.

The communication connection between the first mobile terminal 400 and the second mobile terminal 500 may be requested by either the first mobile terminal 400 or the second mobile terminal 500, and the communication connection can be performed between the terminals based on a normal response to the request. Also, when the communication connection is made between the first mobile terminal 400 and the second mobile terminal 500, an authentication procedure (e.g., a terminal-specific ID, a phone number, or IP information) may be performed between the terminals.

Next, a first control signal is transmitted (SP620). More specifically, after communication is connected, the second controller 505 generates a first control signal for controlling the start of the vehicle 800 connected with the first mobile terminal 400, and transmits the generated first control signal to the first mobile terminal 400. Then, the vehicle is controlled (SP630). In particular, the first controller 408 turns on or off the start of the vehicle 800 connected for communication with the first mobile terminal 400 based on the first control signal transferred from the second mobile terminal 500. In this case, the first mobile terminal 400 may be connected for communication with the vehicle 800 via wireline or wireless communication, such as VNC, a USB, Wi-Fi, Bluetooth™, RFID, infrared communication, UWB, ZigBee, or other communication.

Thereafter, vehicle state information is transmitted (SP640). In particular, the first controller 408 receives the vehicle state information transferred from the vehicle 800 and transmits the received vehicle state information to the second mobile terminal 500. In this case, if the vehicle 800 is a general vehicle, such as an ICV, the vehicle state information can include a fuel level, an engine status, speed information, an air pressure of tire, start ON/OFF information, or door ON/OFF information, or other information. If the vehicle 800 is an EV, such as a pure EV or a HEV, the vehicle state information may include similar or further information, including an SOC, an engine state, speed information, an air pressure of tire, start ON/OFF information, door ON/OFF information, or other information.

In transmitting the vehicle state information, the first controller 408 may also transmit the location information of the first mobile terminal 400 (or that of the vehicle) according to the GPS receiver 401, along with the vehicle state information, to the second mobile terminal 500. Also, after the first controller 408 processes the vehicle state information transferred from the vehicle 800, it may output the processed vehicle state information to the first display unit 406 and/or to the first voice output unit 407.

Thereafter, state information or road guidance information is output (SP650). In particular, the second controller 505 processes the vehicle state information transferred from the first mobile terminal 400 and then outputs the processed vehicle state information to the second display unit 503 and/or to the second voice output unit 504. For example, the second controller 505 processes the speed information and information about air pressure of the tire included in the vehicle state information, and outputs the processed speed information and the information about air pressure of the tire to the second display unit 503 and/or to the second voice output unit 504.

Also, the second controller 505 generates road guidance information based on the received location information of the first mobile terminal 400, and outputs the generated road guidance information to the second display unit 503 and/or to the second voice output unit 504. In this case, the second controller 505 may also display the location of the second mobile terminal 500 along with the generated road guidance information by means of the GPS receiver (not shown) provided in the second mobile terminal 500. Namely, the location information of the first mobile terminal 400 and that of the second mobile terminal can be displayed together with the generated road guidance information.

Alarm information is generated and output when an event occurs (SP660). In particular, if the wireline or wireless communication with the first mobile terminal 400 is abnormally disconnected or if the distance between the first mobile terminal 400 and the second mobile terminal 500 exceeds a pre-set distance value, the second controller 505 generates alarm information and outputs the generated alarm information to the second display unit 503 and/or to the second voice output unit 504. For example, when the wireless connection with the first mobile terminal 400 is abnormally cut off, the second controller 505 generates pre-set first alarm information (e.g., "Connection to the first mobile terminal is released") and outputs the generated first alarm information to the second display unit 503 and/or to the second voice output unit 504.

For another example, if the distance between the location information of the first mobile terminal 400 transferred from the first mobile terminal 400 and the location information of the second mobile terminal 500 exceeds a pre-set distance (e.g., 100 meters), the second controller 505 generates pre-set second alarm information (e.g., "distance to first mobile terminal exceeds 100 meters") and outputs the generated second alarm information to the second display unit 503 and/or to the second voice output unit 504. In generating the alarm information, the second controller 505 performs communication connection with the first mobile terminal 400, and when communication connection with the first mobile terminal 400 is completed, the second controller 505 generates a second control signal for controlling the start of the vehicle 800 connected with the first mobile terminal 400 and transmits the generated second control signal to the first mobile terminal 400

In this manner, the second mobile terminal 500 generates the alarm information based on the connection state with respect to the first mobile terminal 400 or the distance with the first mobile terminal 400, and provides the generated alarm information to the user of the second mobile terminal 500.

Figure 15:
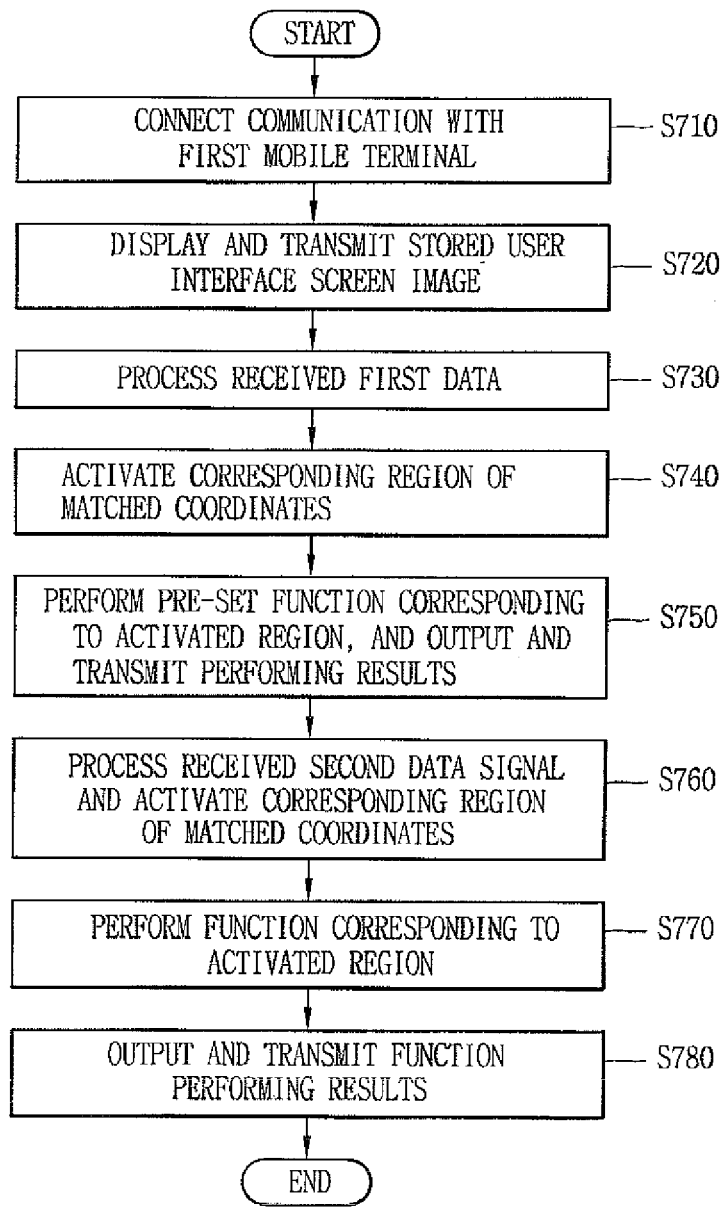
FIG. 15 is a flow chart of a seventh process for communication with a mobile terminal system.

FIG. 15 is a flow chart of a seventh process for communication with a mobile terminal system Initially, communication with a first mobile process is connected (SP710). In particular, the second controller 505 performs a communication connection with the first mobile terminal 400 via the second communication unit 506. In this case, the second communication unit 506 may be connected for communication with the first mobile terminal 400 using wireline or wireless communication, such as a VNC, a USB, Wi-Fi, Bluetooth™, RFID, infrared communication, UWB, ZigBee, or other communication. The communication connection between the second mobile terminal 500 and the first mobile terminal 400 may be requested by either the first mobile terminal 400 or the second mobile terminal 500, and the communication connection can be performed between the terminals based on a normal response to the request.

Thereafter, a stored UI screen image is displayed and transmitted (SP720). In particular, after the normal communication is connected between the terminals, the second controller 505 provides control to display the UI screen image (or the GUI screen image) stored in the second storage unit 502 on the second display unit 503. In this case, the stored UI screen image (or the GUI screen image) includes a menu screen image corresponding to one or more of pre-set functions with a high use frequency in the first mobile terminal 400. The second controller 505 may edit (add or delete a menu, etc.) the UI according to a user input. Also, when the UI is displayed according to the communication connection with the first mobile terminal 400, the second controller 505 may forcibly terminate a certain function (e.g., a processor or an application program) being executed in the second mobile terminal 500. Namely, when the UI is displayed according to the communication connection with the first mobile terminal 400, the second controller 505 may set the highest priority level for the display of the UI and execution of its relevant function.

Figure 16A:
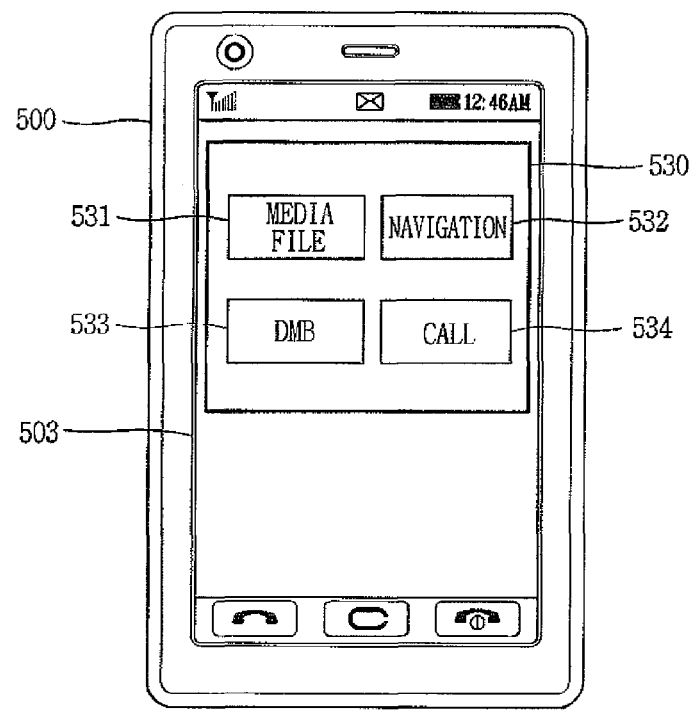
FIGS. 16A to 16F are overviews of display screens of mobile terminals generated with the seventh process.

For example, as shown in FIG. 16A, after the communication connection is made between the terminals, the second controller 505 displays the UI screen image 530 previously stored in the second storage unit 502 on the entire region or on a portion of the display unit 503. Here, the previously stored UI screen image 530 includes menus (or menu buttons) with respect to a media file function 531, a navigation function 532, a DMB function 533, and a call function 534 among a plurality of functions included in the second mobile terminal 500. Also, the second controller 505 transmits data including the UI screen image to the first mobile terminal 400. In transmitting the data including the UI screen image, the second controller 505 also transmits video codec setting information (e.g., codec setting information related to a screen setting or audio codec setting information) of the second mobile terminal 500 to the first mobile terminal 400.

Thereafter, received first data is processed (SP730). In particular, the second controller 505 receives first data transmitted from the connected first mobile terminal 400 and processes (e.g., decoding and/or scaling) the received first data. In this case, the first data transmitted from the first mobile terminal 400 may include coordinate information regarding the function selected correspondingly according to a UI screen image. The second controller 505 matches the coordinate information included in the processed first data to coordinates of data displayed on the second display unit 503. For example, if the processed first data includes coordinate information regarding a media file menu, the second controller 505 matches the coordinate information included in the processed first data to the coordinates corresponding to the media file function 531 displayed on the second display unit 503.

Figure 16B:
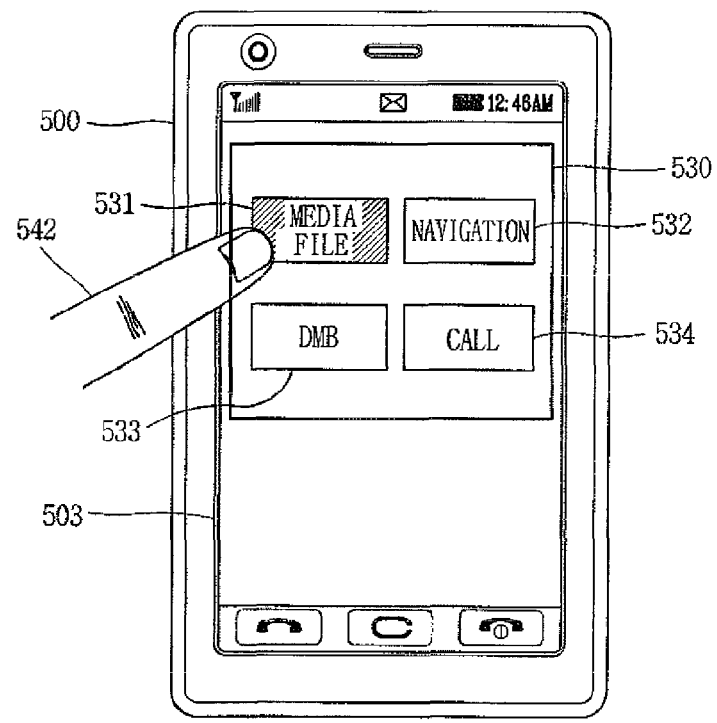

Next, a corresponding region of matched coordinates is activated (SP740). In particular, the second controller 505 provides control to activate a location (or region) corresponding to the matched coordinates among one or more menus included in the UI screen image displayed on the second display unit 503. Also, the second controller 505 provides control to display an emoticon in a mouse shape or a finger shape stored in the second storage unit 502 at a location (region) corresponding to the matched coordinates. For example, as shown in FIG. 16B, when the coordinate information included in the first data transmitted from the first mobile terminal 400 is matched to a 'media file' region in the UI screen image displayed on the second display unit 503, the second controller 505 may provide control to activate the 'media file' region (541) and/or display the finger shape on the 'media file' region in order to indicate that the 'media file' region has been selected from the UI screen image 530 displayed on the second display unit 503. In this case, the activated state or the finger shape displayed state may be maintained for a pre-set time duration or until when additional state information is inputted.

Figure 16C:
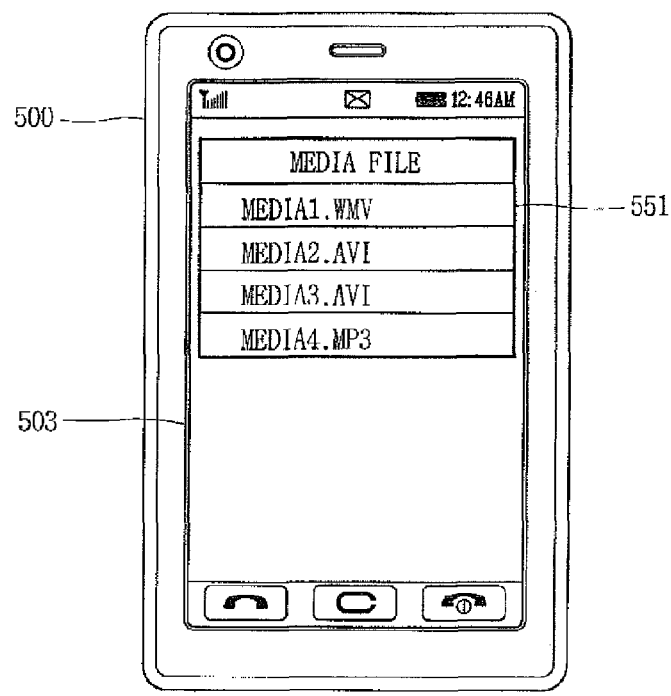

Thereafter, a pre-set function corresponding to the active region is activated and the results of performing the pre-set function are output and transmitted (SP750). In particular, the second controller 505 executes a pre-set function correspondingly according to the activated region. Also, the second controller 505 outputs the function execution results to the second display unit 503 and/or to the second voice output unit 504. For example, if the activated region is the 'media file' region, the second controller 505 searches for a media file, such as a music file, a video file, etc., among a plurality of files stored in the second storage unit 502, namely, the function previously set according to the 'media file' region. Thereafter, as shown in FIG. 16C, the second controller 505 displays the searched media-related file list on the second display unit 503 (551).

Figure 16D:
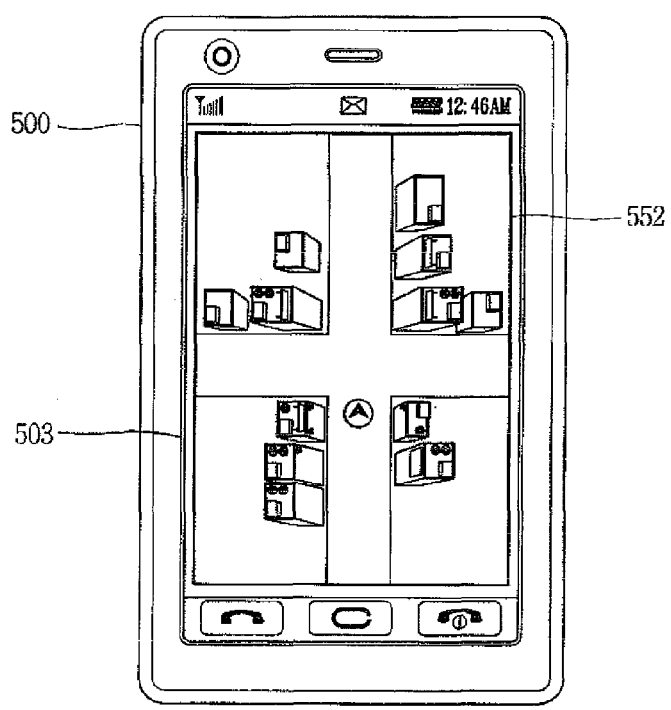
Figure 16E:
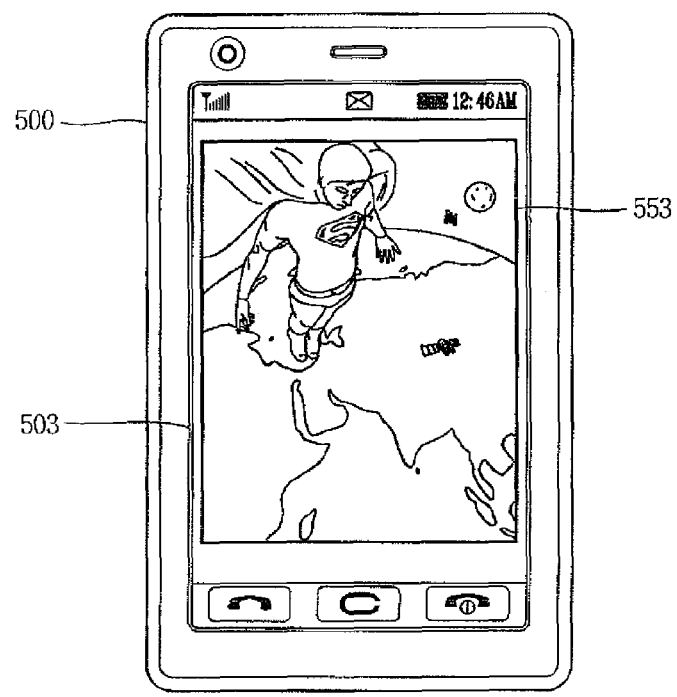

For another example, if the activated region is a 'navigation' region, the second controller 505 searches a navigation application program among a plurality of application programs stored in the second storage unit 502, namely, the function previously set correspondingly according to the 'navigation' region, and executes the searched navigation application program. Thereafter, as shown in FIG. 16D, the second controller 505 outputs the execution results to the second display unit 503 and/or to the second voice output unit 504. Also, if the activated region is a 'DMB' region, the second controller 505 searches a DMB application program among a plurality of application programs stored in the storage unit 502, namely, the function previously set correspondingly according to the 'DMB' region, and executes the searched DMB application program. The second controller 505 executes the DMB application program to receive a broadcast signal via an antenna (not shown), and processes the received broadcast signal. Thereafter, as shown in FIG. 16E, the second controller 505 outputs the processed broadcast signal to the second display unit 503 and/or to the second voice output unit 504 (553).

Figure 16F:
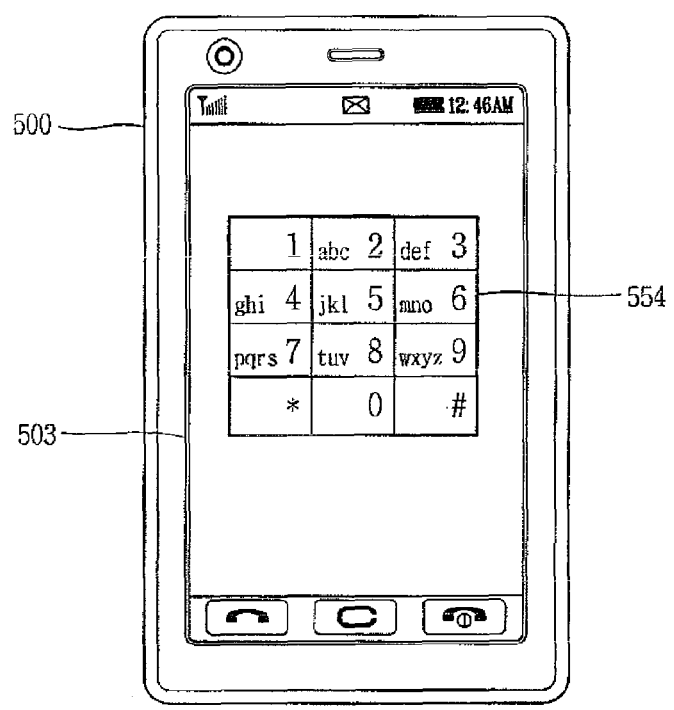

In addition, if the activated region is a 'call' region, as shown in FIG. 16F, the second controller 505 displays a dial screen image (or a phone book screen image) stored in the second storage unit 502, namely, the function previously set correspondingly according to the 'call' region on the second display unit 503 (554). The second controller 505 outputs the results obtained by executing the functions to the second display unit 503 and/or to the second voice output unit 504 and, approximately concurrently, it transmits the function execution results to the first mobile terminal 500 via the second communication unit 506.

Thereafter, a received second data signal is processed and a corresponding region of matched coordinates is activated (SP760). In particular, the second controller 505 receives second data transmitted from the first mobile terminal 400 and processes (e.g., decoding and/or scaling) the received second data. In this case, the second data transmitted from the first mobile terminal 400 includes coordinate information regarding the function selected correspondingly according to the UI screen image, coordinate information regarding the selected function according to a menu screen image, control information corresponding to the selected function, video codec setting information (e.g., codec setting information related to the screen setting or audio codec setting information) of the first mobile terminal 400, various control signals, or other information.

Also, the second controller 505 matches the coordinate information included in the processed second data to the coordinates of the data being displayed on the second display unit 503. The second controller 505 provides control to activate a location (or region) corresponding to the matched coordinates among one or more menus (or functions) included in the UI screen image (e.g., data including the function execution results) being displayed on the second display unit 503. Also, the second controller 505 may provide control to display an emoticon in a mouse shape or a finger shape stored in the second storage unit 502 at a location (region) corresponding to the matched coordinates.

Thereafter, a function corresponding to the activated region is performed (SP770). In particular, the second controller 505 executes a function previously set according to the activated region. For example, when one of media files illustrated in FIG. 16C is selected according to the coordinate information included in the received second data, the second controller 505 executes the selected media file. Also, when a destination is selected from the map data illustrated in FIG. 16D according to the coordinate information included in the received second data, the second controller 606 performs route searching based on the selected destination information, and generates road guidance information according to the route searching.

In addition, when a volume adjustment function is selected from the broadcast information illustrated in FIG. 16E according to the coordinate information included in the received second data, the second controller 505 performs the selected volume adjustment function. Also, when numbers are inputted in the dial screen image illustrated in FIG. 16F according to the coordinate information included in the received second data and a call button is clicked, the second controller 505 performs call connection to the inputted numbers.

Finally, results of performing the function are output and transmitted (SP780). In particular, the second controller 505 outputs the function execution results according to the received second data to the second display unit 503 and/or to the second voice output unit 504 and, approximately concurrently, it transmits the function execution results to the first mobile terminal 400 via the second communication unit 506.

Figure 17:
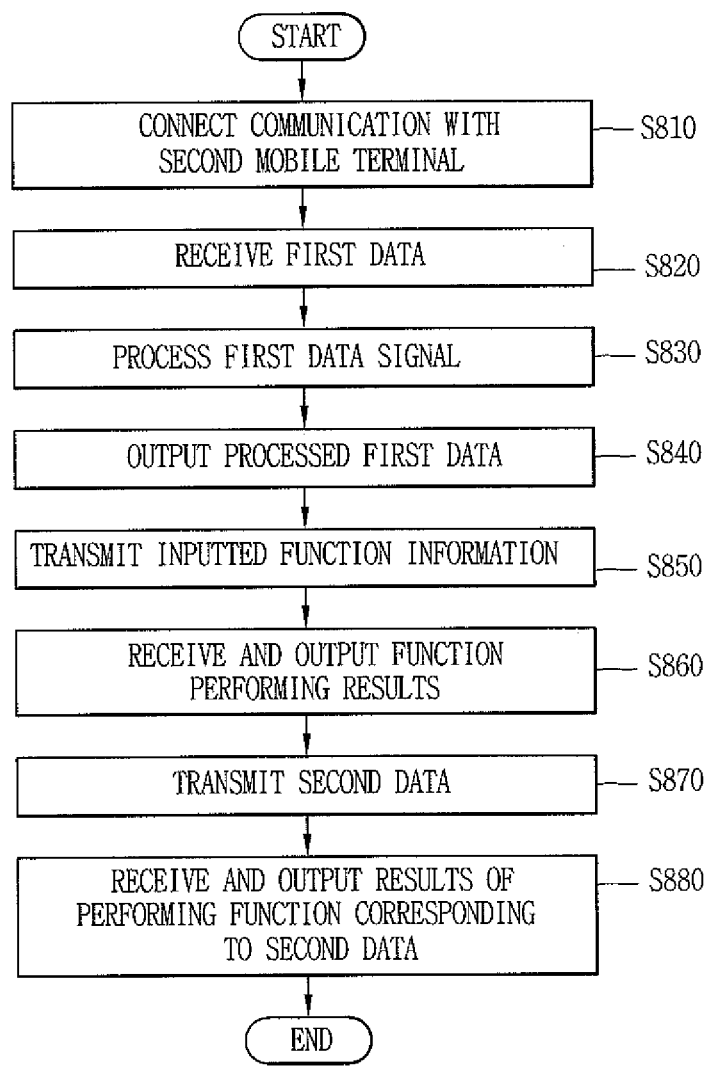
FIG. 17 is a flow chart of a eighth process for communication with a mobile terminal system.

FIG. 17 is a flow chart of an eighth process for communication with a mobile terminal system. First, communication with a second mobile terminal is connected (SP810). In particular, the first controller 408 performs a communication connection with the second mobile terminal 500 via the first communication unit 409. In this case, the first communication unit 409 may be connected for communication with the second mobile terminal 500 using wireline or wireless communication, such as a VNC, a USB, Wi-Fi, Bluetooth™, RFID, infrared communication, UWB, ZigBee, or other communication. The communication connection between the first mobile terminal 400 and the second mobile terminal 500 may be requested by either the first mobile terminal 400 or the second mobile terminal 500, and the communication connection can be performed between the terminals based on a normal response to the request.

Then, first data is received (SP820). In particular, after normal communication is connected between the terminals, the first controller 408 receives first data including the UI screen image (or the GUI screen image) transmitted from the second mobile terminal 500 and/or video codec setting information (e.g., codec setting information related to a screen setting or audio codec setting) of the second mobile terminal 500 via the first communication unit 409. In this case, the UI screen image (or the GUI screen image) includes a menu screen corresponding to one or more of the pre-set functions with a high use frequency in the first mobile terminal 400 among the plurality of functions included in the second mobile terminal 500.

Thereafter, a first data signal is processed (SP830). In particular, the first controller 408 processes the received first data (e.g., decoding and/or scaling) based on the received video codec setting information of the second mobile terminal 500 and the video codec setting information of the first mobile terminal 400 stored in the first storage unit 405. Next, processed first data is output (SP840). In particular, the first controller 408 displays the processed first data on the first display unit 406. In this case, the first controller 408 may display the first data on the entire region or on a portion of the first display unit 406.

Figure 18A:
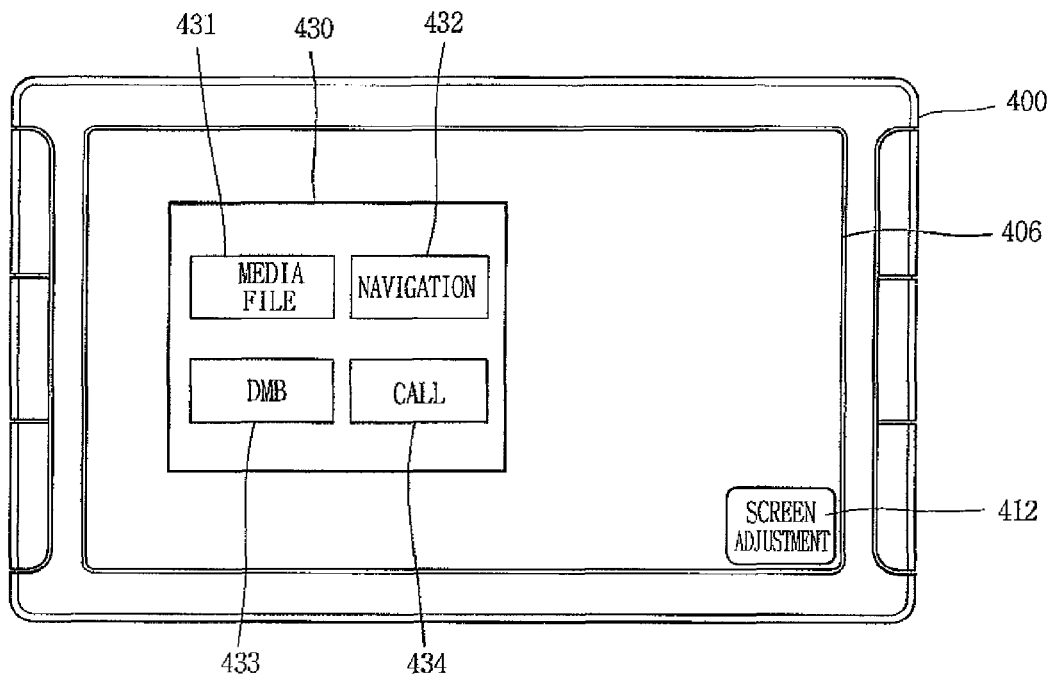
FIGS. 18A to 18E are overviews of display screens of mobile terminals generated with the eighth process.

For example, as shown in FIG. 18A, the first controller 408 displays the processed UI screen image 430 on the first display unit 406. In this case, content of the UI screen image 430 illustrated in FIG. 18A is the same as that of the UI screen image 530 displayed on the second display unit 503 (that is, the content of UI screen image illustrated in FIG. 18A and that of the UI screen image illustrated in FIG. 16A are the same, and the screen size may be equal, smaller or larger) of the second mobile terminal 500. Also, when a button provided at one side of the first mobile terminal 400 is clicked or a 'screen adjustment' button 412 displayed on a portion of the first display unit 406 is clicked, the first controller 408 re-scales the data displayed on the first display unit 406 (e.g., rotates the currently displayed screen image by 90 degrees or 180 degrees right and left) and displays the re-scaled data on the first display unit 406.

Next, inputted function information is transmitted (SP850). In particular, the first controller 408 transmits information regarding a function (menu or coordinates) selected by the user from among the UI screen image displayed on the first display unit 406 to the second mobile terminal 500 via the first communication unit 409. Thereafter, the first controller 408 receives the results obtained by executing the corresponding function transmitted from the second mobile terminal via the first communication unit 409, processes (e.g., decoding and/or scaling) the received function execution results, and outputs the same to the first display unit 406 and/or to the first voice output unit 407.

Figure 18B:
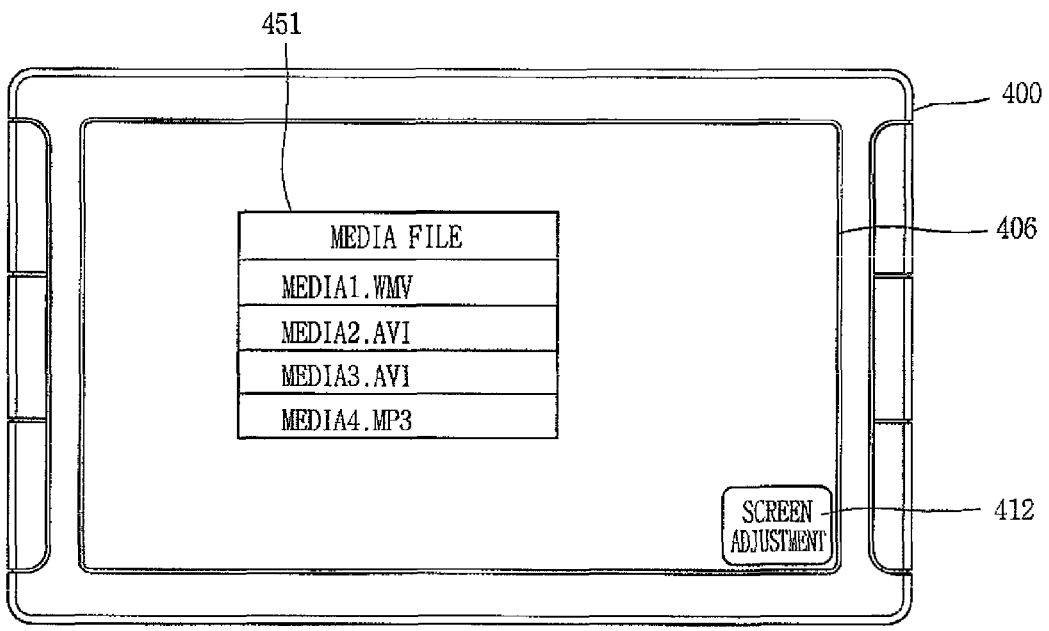
Figure 18C:
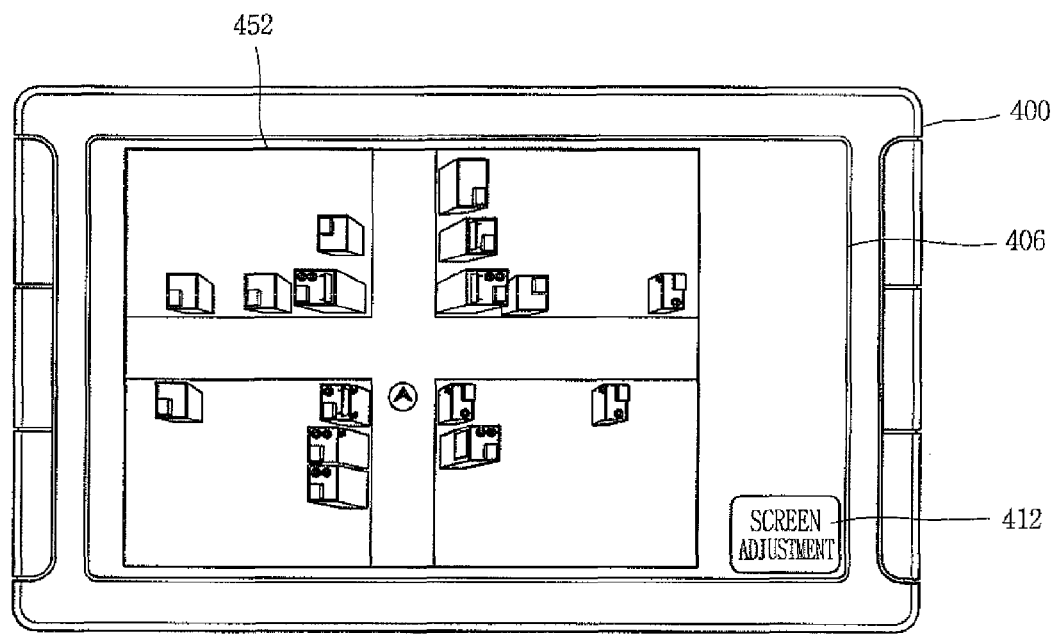

For example, when the 'media file' 431 is selected from the UI screen image illustrated in FIG. 18A, the first controller 408 receives function execution results (e.g., including information regarding a list of a plurality of media related files) corresponding to the selected 'media file' 431 via the first communication unit 409. Thereafter, as shown in FIG. 18B, the first controller 408 processes the received function execution results and displays the same on the first display unit 406 (451). For another example, when the 'navigation' 432 is selected from the UI screen image illustrated in FIG. 18A, the first controller 408 receives function execution results (e.g., including location information according to a current location of the first mobile terminal 400) corresponding to the selected 'navigation' 432 via the first communication unit 409. Thereafter, as shown in FIG. 18C, the first controller 408 processes the received function execution results and outputs the same to the first voice output unit 407 (452).

Figure 18D:
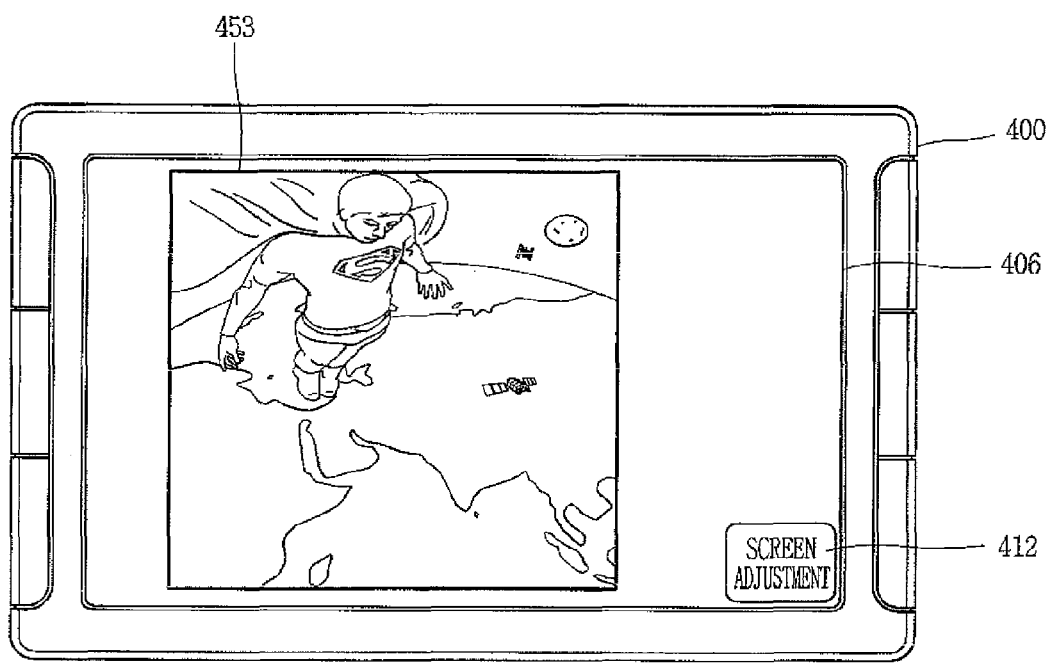

Also, when the 'DMB' 433 is selected from the UI screen image illustrated in FIG. 18A, the first controller 408 receives function execution results (e.g., including broadcast information) corresponding to the selected 'DMB' 433 via the first communication unit 409. Thereafter, as shown in FIG. 18D, the first controller 408 processes the received function execution results and outputs the same to the first display unit 406 and/or to the first voice output unit 407. For still another example, when the 'call' 434 is selected from the UI screen image illustrated in FIG. 18A, the first controller 408 receives function execution results (e.g., including stored dial screen image information) corresponding to the selected 'call' 434 via the first communication unit 409.

Figure 18E:
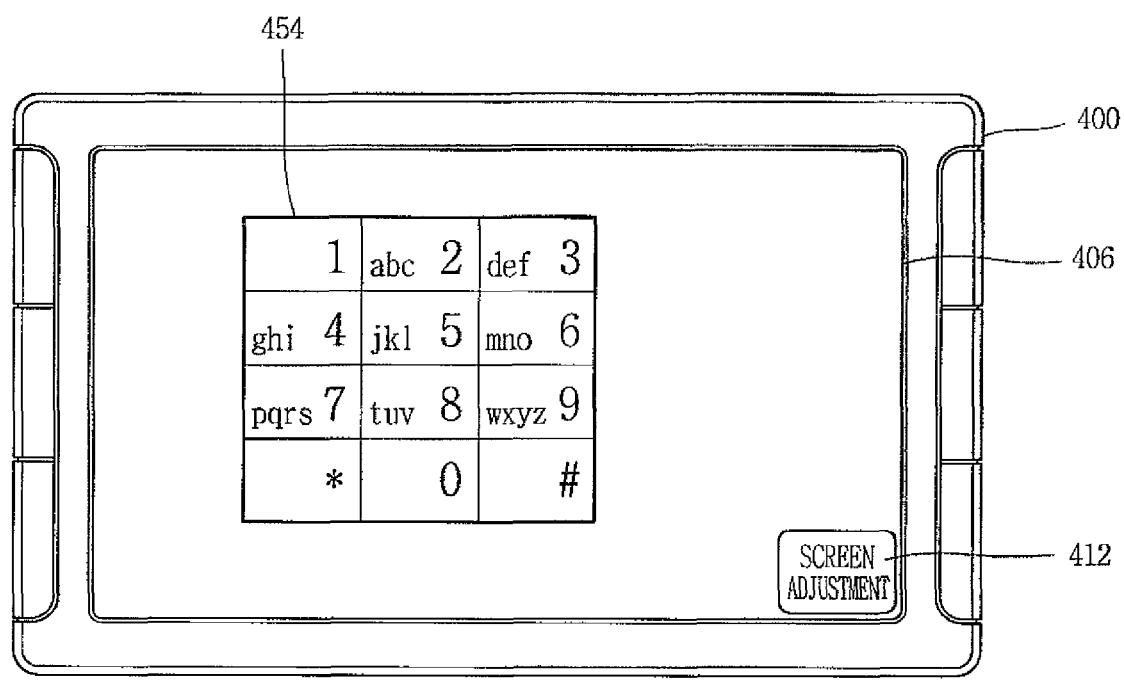

Next, results of performing the function are received and output (SP860). In particular, as shown in FIG. 18E, the first controller 408 processes the received function execution results and displays the same on the first display unit 406. Then, second data is transmitted (SP870). In particular, the first controller 408 transmits second data including information regarding a function (menu or coordinates) selected by the user from among the function execution results displayed on the first display unit 406 to the second mobile terminal 500.

Finally, the results of performing a function corresponding to the second data are received and output (SP880). In particular, the first controller 408 receives the function execution results with respect to the second data transmitted from the second mobile terminal 500 via the first communication unit 409, processes (e.g., decoding and/or scaling) the received function execution results, and outputs the same to the first display unit 406 and/or to the first voice output unit 407. For example, when 'Media2.avi' is selected from the UI screen image illustrated in FIG. 18B, the first controller 408 receives results obtained by executing (playing) the selected 'Media2.avi'. Thereafter, the first controller 408 processes the received execution results of the 'Media2.avi' and outputs the same to the first display unit 406 and/or to the first voice output unit 407.

Also, when a 'starting point' and a 'destination' are selected from the UI screen image illustrated in FIG. 18C and a route search button (not shown) is selected, the first controller 408 receives results obtained by performing route searching based on the selected destination information (e.g., the starting point and destination). Thereafter, the first controller 408 outputs the received route search results to the first display unit 406 and/or to the first voice output unit 407. In addition, when a 'volume adjustment' button (not shown) is selected from the UI screen image illustrated in FIG. 18D, the first controller 408 receives results obtained by performing the selected volume adjustment function. Thereafter, the first controller 408 outputs the received route search results to the first voice output unit 407. Further, when certain numbers are inputted from the UI screen image (e.g., a dial screen image) illustrated in FIG. 18E and the 'call' button is selected, the first controller 408 receives results obtained by performing a call connection with the inputted numbers. Thereafter, the first controller 408 performs a call connection with an external terminal with the inputted numbers according to the performing results.

The following description provides examples of functionality that may be provided in various implementations described above. As so far described, in the first and second mobile terminals that are wireline or wirelessly connected, data outputted to the second mobile terminal is transmitted to the first mobile terminal to allow the first mobile terminal to output the corresponding data, whereby the function of the second mobile terminal can be extended.

Also, in the first and second mobile terminals that are wireline or wirelessly connected while outputting the same screen image, the results of an application program including a first function included only in the second mobile terminal are displayed on the first and second mobile terminals, respectively, and a first function selected (inputted) from the first mobile terminal is received by the second mobile terminal to allow the second mobile terminal to perform the first function, whereby although the first mobile terminal does not have the application program including the first function, it can receive the corresponding function execution results.

Further, in the first and second mobile terminals that are wireline or wirelessly connected, a unique function included in each mobile terminal is allowed to be used by the others connected with each other, thereby extending a usage coverage of each mobile terminal. Additionally, in the first and second mobile terminals that are wireline or wirelessly connected, the second mobile terminal performs a pre-set function based on vehicle state information transmitted from a vehicle connected with the first mobile terminal, thereby implementing an application function such as a location-based service. Moreover, in the first and second mobile terminals that are wireline or wirelessly connected, the vehicle connected with the first mobile terminal controls its start or door based on a controls signal transmitted from the second mobile terminal, whereby the vehicle can be conveniently controlled remotely.

In addition, in a state that a UI screen image (or a GUI screen image) including a menu screen image corresponding to at least one of a plurality of functions (e.g., application program) included in the first mobile terminal is configured, when the first mobile terminal is connected with the second mobile terminal, the configured UI screen image is provided to the second mobile terminal, whereby the second mobile terminal can conveniently use the function included in the first mobile terminal.

The above disclosure may be embodied in various forms without departing from the characteristics thereof, it should also be understood that the above-described implementation are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method performed by a mobile communication terminal, the method comprising:
displaying, on a display of the mobile communication terminal, a screen image of an executed application program in response to a user input, wherein the screen image includes a plurality of images;
transmitting, to a vehicle communication terminal having a touch screen, the screen image of the executed application program and screen setting information of the mobile communication terminal, wherein the vehicle communication terminal is configured to display the transmitted screen image on the touch screen of the vehicle communication terminal based on the screen setting information of the mobile communication terminal, and wherein the transmitted screen image comprises a plurality of graphic objects having substantially the same meaning as the plurality of images displayed on the display of the mobile communication terminal;
receiving, from the vehicle communication terminal, information related to a particular graphic object from among the plurality of graphic objects in the transmitted screen, image when the particular graphic object is selected by a touch input applied to the touch screen of the vehicle communication terminal;
highlighting, based on the information received from the vehicle communication terminal, an image, having substantially the same meaning as the particular graphic object, from among the plurality of images in order to indicate that the particular graphic object having substantially the same meaning as the image selected at the vehicle communication terminal by the touch input; and
executing a function corresponding to the highlighted image included in the screen image displayed on the display of the mobile communication terminal.

2. The method of claim 1 further comprising:
transmitting, from the mobile communication terminal and to the vehicle communication terminal, a second screen image of the executed function.

3. The method of claim 1 wherein executing the function corresponding to the highlighted image included in the screen image displayed on the display of the mobile communication terminal includes placing a telephone call to a number corresponding to an entry in a phonebook.

4. The method of claim 1 wherein the screen image of the mobile communication terminal includes a map corresponding to a route.

5. The method of claim 1 further comprising receiving, from the vehicle communication terminal, information regarding a status of a vehicle comprising the vehicle communication terminal.

6. The method of claim 5 wherein the received information regarding the status of the vehicle comprises at least one of a vehicle speed or a vehicle operating condition.

7. A mobile communication terminal comprising:
a display;
a communication unit configured to communicate with a vehicle communication terminal; and
a controller configured to:
display, on the display, a screen image of an executed application program in response to a user input, wherein the screen image includes a plurality of images;
transmit, via the communication unit and to the vehicle communication terminal, the screen image of the executed application program and screen setting information of the mobile communication terminal, wherein the vehicle communication terminal is configured to display the transmitted screen image on a touch screen of the vehicle communication terminal based on the screen setting information of the mobile communication terminal, wherein the transmitted screen image comprises a plurality of graphic objects having substantially the same meaning as the plurality of images displayed on the display of the mobile communication terminal, receive, via the communication unit and from the vehicle communication terminal, information related to a particular graphic object among the plurality of graphic objects in the transmitted screen image when the particular graphic object is selected by a touch input applied to the touch screen of vehicle communication terminal;

highlight, based on the information received from the vehicle communication terminal, an image, having substantially the same meaning as the particular graphic object, from among the plurality of images in order to indicate that the particular graphic object having substantially the same meaning as the image selected at the vehicle communication terminal by the touch input; and execute a function corresponding to the highlighted image included in the screen image displayed on the display of the mobile communication terminal.

8. The terminal of claim 7 wherein the controller is further configured to:
transmit, via the communication unit and to the vehicle communication terminal, a second screen image of the executed function.

9. The terminal of claim 7 wherein, the controller is further configured to execute the function corresponding to the highlighted image included in the screen image displayed on the display of the mobile communication terminal by placing a telephone call to a number corresponding to an entry in a phonebook.

10. The terminal of claim 7 wherein the screen image of the mobile communication terminal includes a map corresponding to a route.

11. The terminal of claim 7 wherein the controller is further configured to receive from the vehicle communication terminal information regarding a status of a vehicle comprising the vehicle communication terminal, wherein the received information regarding the status of the vehicle comprises at least one of a vehicle speed or a vehicle operating condition.

12. A method performed by a vehicle communication terminal, the method comprising:
receiving, from a mobile communication terminal having a display, a screen image of an executed application program and screen setting information of the mobile communication terminal, wherein the vehicle communication terminal includes a touch screen, wherein the received screen image includes a plurality of graphic objects, wherein the mobile communication terminal is configured to display the screen image of the executed application program on the display of the mobile communication terminal, and wherein the screen image displayed on the display of the mobile communication terminal comprises a plurality of images having substantially the same meaning as the plurality of graphic objects displayed on the touch screen of the vehicle communication terminal;

displaying, on the touch screen of the vehicle communication terminal, the received screen image based on the screen setting information of the mobile communication terminal;

receiving, on the touch screen of the vehicle communication terminal, a touch input applied to a particular graphic object from among the plurality of graphic objects in the received screen image; and transmitting, to the mobile communication terminal, information related to the particular graphic object selected by the touch input that was applied to the touch screen of the vehicle communication terminal, wherein the mobile communication terminal highlights, based on the information received from the vehicle communication terminal, an image, having substantially the same meaning as the particular graphic object, from among the plurality of images in order to indicate that the particular graphic object having substantially the same meaning as the image selected at the vehicle communication terminal by the touch input, and wherein the mobile communication terminal executes a function corresponding to the highlighted image included in the screen image displayed on the display of the mobile communication terminal.

13. The method of claim 12 wherein receiving of the screen image of the executed application program comprises processing the received screen image of the mobile communication terminal to adjust the screen image of the mobile communication terminal to fit the touch screen of the vehicle communication terminal.

14. The method of claim 12 wherein receiving the screen image from the mobile communication terminal includes receiving a map corresponding to a route.

15. The method of claim 12 further comprising transmitting information regarding a status of a vehicle comprising the vehicle communication terminal to the mobile communication terminal, wherein the status of the vehicle includes at least one of a vehicle speed or a vehicle operating condition.

16. A vehicle communication terminal comprising:
a vehicle terminal touch screen;
a communication unit configured to communicate with a mobile communication terminal having a display; and
a controller configured to:
receive, via the communication unit and from the mobile communication terminal, a screen image of an executed application program and screen setting information of the mobile communication terminal, wherein the received screen image includes a plurality of graphic objects, wherein the mobile communication terminal is configured to display the screen image of the executed application program on the display of the mobile communication terminal, and wherein the screen image displayed on the display of the mobile communication terminal comprises a plurality of images having substantially the same meaning as the plurality of graphic objects displayed on the touch screen of the vehicle communication terminal, display, on the vehicle terminal touch screen, the received screen image based on the screen setting information of the mobile communication terminal, and receive, on the vehicle terminal touch screen, a touch input applied to a particular graphic object from among the plurality of graphic objects in the received screen image, transmit, to the mobile communication terminal, information related to particular graphic object selected by the touch input that was applied to the touch screen of the vehicle communication terminal, wherein the mobile communication terminal highlights, based on the information received from the vehicle communication terminal, an image, having substantially the same meaning as the particular graphic object, from among the plurality of images in order to indicate that the particular graphic object having substantially the same meaning as the image selected at the vehicle communication terminal by the touch input, and wherein the mobile communication terminal executes a function corresponding to the highlighted image included in the screen image displayed on the display of the mobile communication terminal.

17. The terminal of claim 16 wherein the controller includes one or more processors.

18. The terminal of claim 16 wherein the controller is configured to process the received screen image of the mobile communication terminal to adjust the screen image of the mobile communication terminal to fit the vehicle terminal touch screen.

19. The terminal of claim 16 wherein the controller is further configured to transmit to the mobile communication terminal information regarding a status of a vehicle comprising the vehicle communication terminal, wherein the information regarding the status of the vehicle comprises at least one of a vehicle speed or a vehicle operating condition.

20. The terminal of claim 7, wherein the terminal is connected to the vehicle communication terminal using at least one of a Virtual Network Computing (VNC), a Universal Serial Bus (USB), Wi-Fi, Bluetooth, radio-frequency identification (RFID), infrared communication, ultra-wideband (UWB), ZigBee, and wire communication.

21. The terminal of claim 16, wherein the terminal is connected to the vehicle communication terminal using at least one of a Virtual Network Computing (VNC), a Universal Serial Bus (USB), Wi-Fi, Bluetooth, radio-frequency identification (RFID), infrared communication, ultra-wideband (UWB), ZigBee, and wire communication.

* * * * *